(12) United States Patent
Gray et al.

(10) Patent No.: US 7,415,104 B2
(45) Date of Patent: Aug. 19, 2008

(54) CONTEXT AWARE CALL HANDLING SYSTEM

(75) Inventors: Thomas A. Gray, Carp (CA); Ramiro Liscano, Nepean (CA); Yongseok Choi, Coquitlam (CA); Thiruvengadam Radhakrishnan, Brossard (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 718 days.

(21) Appl. No.: 10/631,834

(22) Filed: Aug. 1, 2003

(65) Prior Publication Data

US 2005/0100157 A1    May 12, 2005

(30) Foreign Application Priority Data

Aug. 12, 2002  (GB) .................. 0218712.8

(51) Int. Cl.
*H04M 3/42* (2006.01)
(52) U.S. Cl. .............. 379/201.01; 379/201.12; 719/310; 719/313; 719/318; 719/328; 717/100; 717/101; 717/103
(58) Field of Classification Search .......... 379/201.01–201.12; 719/310–313, 318, 328; 717/100, 101, 103
See application file for complete search history.

(56) References Cited

U.S. PATENT DOCUMENTS

| 5,590,188 | A | * | 12/1996 | Crockett ................ 379/265.02 |
| 6,301,609 | B1 | | 10/2001 | Aravamudan et al. |
| 6,421,439 | B1 | | 7/2002 | Liffick |
| 6,700,967 | B2 | * | 3/2004 | Kleinöder et al. ......... 379/201.1 |
| 2005/0246682 | A1 | * | 11/2005 | Hines ........................ 717/109 |

FOREIGN PATENT DOCUMENTS

| EP | 0 510 411 B1 | 3/1992 |
| EP | 0 825 752 A2 | 2/1998 |
| GB | 2 351 870 A | 10/2001 |
| GB | 2 369 529 A | 5/2002 |
| WO | WO 99/26424 | 5/1999 |

* cited by examiner

*Primary Examiner*—Quynh H Nguyen

(57) ABSTRACT

A communication system comprising one or more ubiquitous sensor(s) for generating awareness data relating to a user, a context engine for receiving and processing the awareness data to determine the user's current context for the purpose of event handling, a policy engine for receiving and relating at least one pertinent evidential indicator of an incoming event from a caller to the user's current context and in response selecting a preferred event handling feature, and a delivery agent for executing the preferred event handling feature.

27 Claims, 25 Drawing Sheets

ACD: Registration

| | |
|---|---|
| User ID | kim |
| Password | ******** |
| First Name | insook |
| Last Name | kim |
| Phone Numbers | |
| Office (main) | 4579 |
| Home | 933-5154 |
| Cell | 981-2938 |
| Secretary | 4907 |

[Register] [Cancel]

FIG.17

| First Name | Last Name | Phone # | Relationship |
|---|---|---|---|
| Thomas | Ragan | 4021 | boss |
| Micheal | Graham | 4440 | family |
| Mindy | baker | 4441 | friend |
| Katherine | Simpson | 4442 | manager |
| Toby | Maker | 4443 | friend |
| Chris | Turker | 4444 | family |
| Molly | Thompson | 4445 | SIP related |
| Diana | Rose | 4001 | secretary |
| Ismael | Jason | 4022 | team member | choi: User rule Setting Window

| Seq# | User-rule Name |
|---|---|
| 0 | Worker-office rule |
| 1 | Thomas Ragan-busy rule |
| 2 | worker-meeting time rule |
| 3 | wife-busy rule |
| 4 | Ismael Jason-meeting time-meeting room rule |
| 5 | worker-office-busy rule |
| 6 | teammember-other-onthephone-lunchtime rule |

Add
Refresh
Remove
Clear
Finish

Description for the rule

[CONDITION]
If a call comes from worker
When I'm in the office
When I'm busy

[ACTION]
Forward it to voice mailbox

FIG.22 choi: User-rule Setting - (2 of 4) ☒

2. Select Caller Condition

If a call is coming from specific,

○ Any Caller

◉ Buddy

| First Name | Last Name | Phone # | Relationship |
|---|---|---|---|
| Thomas | Ragan | 4021 | boss |
| Micheal | Graham | 4440 | family |
| Mindy | baker | 4441 | friend |
| Katherine | Simpson | 4442 | manager |
| Toby | Maker | 4443 | friend |

○ Relationship

```
▾ 📁 relationship
   ▾ 📁 worker
        📄 boss
        📄 manager
        📄 secretary
    ▾ 📁 team member
```

Next -> context condition-> caller condition-> action-> confirm

FIG.24 choi: User-rule Setting - (3 of 4)    [X]

3. Select An Action

○ Put through the call

◉ Forward to secretary

○ Forward it to voice mailbox

○ Forward it to where I am

○ Notify me on the screen

○ Ask the caller what to do

[Next->]

context condition-> caller condition-> action-> confirm

FIG.25

CONTEXT AWARE CALL HANDLING SYSTEM

BACKGROUND OF THE INVENTION

1. Field of the Invention

This invention relates generally to communication systems, and more particularly to a context aware call processing architecture for effecting user-defined features.

2. Description of the Prior Art

Traditional telephony features are standardized and coarse grained. Users are given access to a plurality of features (Call Forward on Busy etc.) that are centrally located within a communication system, such as a PBX.

The utility of these features is limited by their inability to be personalized to the needs of an individual and to be aware of the user's current activities. For example, a user may be occupied with some work. Such a user will therefore be 'busy' in relation to other work of less importance but 'available' in relation to work of higher priority or to information about his/her current task. Traditional telephony features such as Call Forward on Busy are coarse-grained and therefore cannot match these important human distinctions.

The very limited degree of personalization in feature sets according to the prior art results from the fact that traditional call processing has relied on a centralized definition of common features to accelerate the time to market and to improve system stability. Expert designers typically develop standard features that are tested for compatibility before deployment. Personalization with such a scheme is impossible because of the large numbers of possible personalized features.

The Internet telephony work on the SIP protocol (IETF) has created the CPL standard that partially addresses the goal of achieving personalized features (see Sinnreich, H; Johnston, A. B., *Internet Communication Using SIP*, Wiley, 2001 pp 104-108, and The Internet Draft by Schulzrinne, H.; Rosenberg, J.; SIP Caller Preferences and Callee Capabilities, draft-ietf-sip-callerprefs-05.txt available at: http://www-.softarmor.com/sipwg/drafts/draft-ietf-sip-callerprefs-05.txt). Although CPL allows the user a limited ability to locally specify call handling, it does not go beyond specifying policies on call handling based on the identity of the incoming caller and time of day. It does not take into account the user's context and is unable to accommodate conflict handling between user policies, thereby severely limiting the utility of CPL, it's scalability and evolvability.

SUMMARY OF THE INVENTION

According to the present invention, an architecture and implementation are provided by which telephony features can be personalized to meet fine-grained needs. The parameters that affect personalization features are considered to be part of a user's work context and so these features are called 'context-aware'.

More particularly, the system according to the present invention is capable of:

1. Generating relevant information from incoming call messages and relating that to a user's current context;
2. Identifying current user context and representing it in a way that can be utilized in call handling;
3. Providing means to specify personalized features in a way that is natural to untrained users while still providing the regularity that allows for efficient execution
4. Providing means for identifying feature conflict and resolving such conflicts in an intuitive manner to accommodate the needs of untrained users.

Unique aspects of this invention include:

1. A blackboard-based architecture for generation of user context information from incoming call information and relating that to the current user context
2. Standard means and parameters for specifying a user's context as it is pertinent to call handling;
3. Means for detecting feature conflicts and resolving these conflicts in ways expected by naïve users;
4. Means for user specification of personalized features that is compatible with the ability and expectations of naŸve users while still providing the regularity required for efficient execution.

BRIEF DESCRIPTION OF THE DRAWINGS

A detailed description of the invention is set forth herein below, with reference to the following drawings, in which:

FIG. 17 is a user registration window displayed to the user during operation of the system according to the present invention;

FIG. 22 is a user rule setting window displayed to the user during operation of the system according to the present invention;

FIG. 24 is a window displayed to the user for selecting caller condition when setting a user rule according to the present invention;

FIG. 25 is a window displayed to the user for selecting an action when setting a user rule according to the present invention;

DETAILED DESCRIPTION OF THE PREFERRED EMBODIMENT

Figure 1:
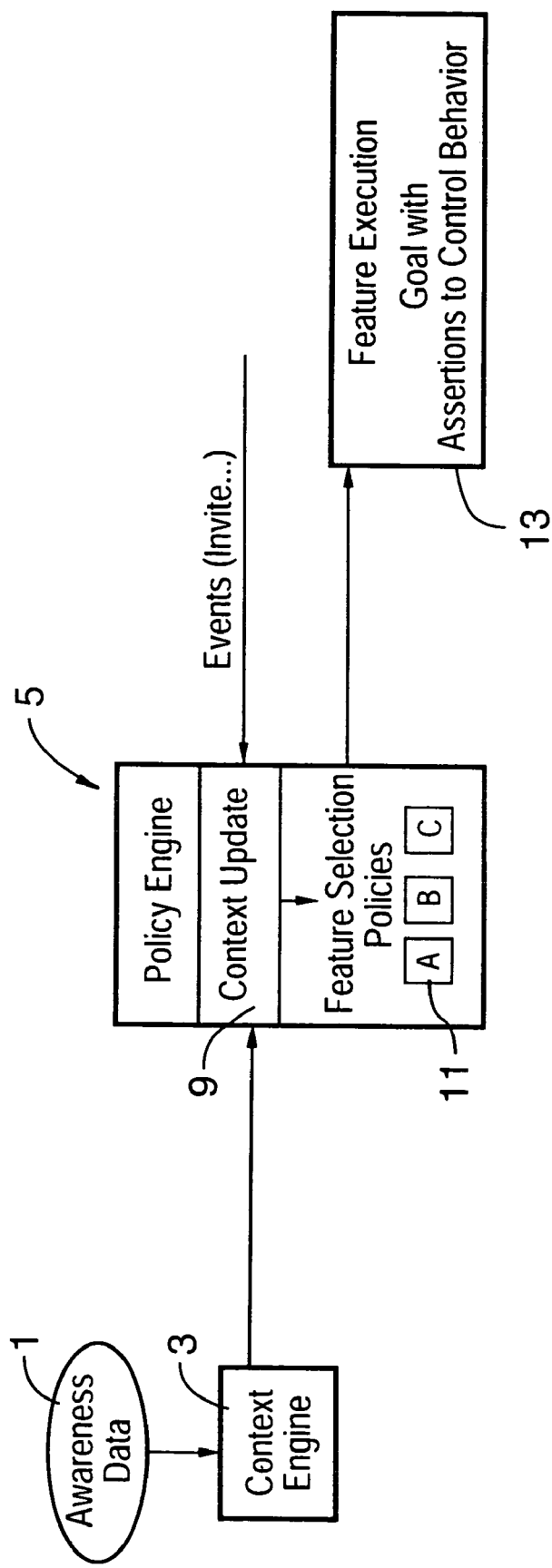
FIG. 1 is a functional diagram of the Internet telephony system according to the present invention, which embodies a distributed call processing model.

Turning to FIG. 1, a functional diagram is provided of the system according to the present invention. In operation, awareness data 1 is received from one or more ubiquitous sensors (not shown), relating to the user's location and activities, and applied to a context engine 3. A variety of technologies are available for tracking the locations of people. Examples of such ubiquitous sensors include the Active Badge System [Roy Want, Andy Hopper, Veronica Falcao, Jonathan Gibbons, "The Active Badge Location System", *ACM Transactions on In formation Systems* 10(1) 91-102, 1992], PARCTabs [Norman Want, "The PARCTAB Mobile Computing System", *Proceedings of the Fourth Workshop on Workstation Operating Systems* (WWOS-IV), pages 34-39, Napa, Calif., October 1993], mobile phones [Peter Dutfet-Smith, "High precision CURSOR and digital CURSOR: the real alternatives to GPS", *Proceedings of EURONAV 96 Conference on Vehicle Navigation and Control*, Royal Institute of Navigation, 1996] and ultrasonic devices [Andy Ward, Alan Jones and Andy Hopper, "A new location technique for the active office", IEEE Personal Communications 4(5), 43-7, 1997].

Our co-pending patent application filed on the same day as this application and entitled "Availability and Location Predictor Using Call Processing Indications", describes a method of evidence gathering that surmises (i.e. makes guesses) about user availability from his/her interactions with a PBX system. The interactions are gathered as awareness information and processed by an algorithm into availability information. By using awareness information as evidence, the algorithm makes predictions about the users' availability or makes decisions in call processing. This information is fed back into a shared database (e.g. a tuple space) as assertions that indicate high level assessments about the user's state. These assessments are then used by the call processing components described below to make decisions on call handling.

Additional inventive aspects relating to the application of awareness data 1 to context-based communication systems is set forth in our copending applications filed on the same date as this application and entitled "System and Method for Facilitating Communication Using Presence and Communication Services" and "Generation of Availability Indicators from Call Control Policies for Presence Enabled Telephony System".

Awareness data (i.e. raw information about the user) that has been processed by context engine 3 into availability information is then applied to a policy engine 5 in the form of assertions of interest to policies within the system, as described in detail below. The policy engine 5 includes a context update block 9 and feature selection policies 11.

In context update block 9, an incoming event (e.g. Invite, etc.) is related to the current context of the user. Every event has associated with it some indicators that are pertinent to the user's call that provide evidence of the relevance, urgency and importance of the call to the user. Such indicators include caller identity, role relationship between caller and called party, group or project membership, location of user, current state of called user, subject of the call, and so on. Some of these evidential indicators are explicit in the call and some can be derived by inference from other indicators (e.g. awareness data, as discussed above). The context update block 9 uses opportunistic reasoning to develop the required evidence. This evidence is then supplied to the feature selection policies 11 for selecting a feature, discussed in greater detail below. As discussed in our counterpart application entitled "Generation of Availability Indicators from Call Control Policies for Presence Enabled Telephony System", the evidential indicators may be in the form of fuzzy variables. The fuzziness of these variables is used to indicate the degree of credence that the system has in them.

In the context update evidence gathering process performed by block 9, the system occasionally asks the user which feature he/she wishes to have executed. Sending the user options to his/her wireless browser asking for his/her selection is one among several mutually appropriate options for accomplishing this. Moreover, options may be sent to the calling party asking him/her to select one of several acceptable options.

As discussed above, the user sets some of the policies used in the opportunistic reasoning of context update block 9, although many of the policies are implicit in the way people generally interact. Thus, several default policies are set by system administrators using sociological principles. Examples of such default policies include calls from superiors being more important than calls from subordinates, someone alone in an office being more available than someone with several visitors, calls with a subject related to a user's current activities are less intrusive than calls with unrelated subjects, etc.

Once the user context has been updated with call specific information in block 9, the feature to be performed is selected in block 11. Feature selection policies block 11 utilizes the evidence generated previously in block 9 to direct call handling in accordance with policies set by the user governing the personalized call handling he/she expects. These policies indicate how calls should be handled for differing role relationships, time of day, user state, user location etc. According to applicant's counterpart application filed on the same day as this application and entitled "Personalizable and Customizable Feature Execution and Specification System for IP Telephony Using Operational Semantics and Deontic Task Trees", block 11 uses forward chaining with fuzzy reasoning to generate priorities among all proposed features and relates that to the intrusiveness of the proposed actions. This results in the selection of a single feature as being the most appropriate for call handling given the declared personalized preferences of the user. The feature is then executed, as shown at block 13.

The execution of features at block 13 can be modulated as described in co-pending UK Application No. 9920051.1 (Call Processing by Synchronized Tuple Spaces) to allow external features acting as enterprise constraints to control the execution of the selected feature.

Thus, with the new addressing capabilities of Internet-based telephony, features can take on new semantics. Instead of remaining at the device level as in conventional telephony, features can operate at a personal level. Calls are not directed to physical endpoints but rather to aspects of the user's identity within his/her business context. A user may have multiple aspects to his/her identity, each of which has different capabilities in the business environment. For example, a user may have multiple aspects to his identity in the form of:

Voice mail box for messages that do not need current attention

Secretary or equivalent function that can use mechanisms outside of call processing to make routine decisions about call disposition and other matters to shield the user from interruption Identities that represent the user in distinct current projects Etc.

These multiple identities may be carried directly in URLs that convey meaning in respect to aspects of the user's identity using the standard 'dot' convention. Thus, a user named John Doe may have multiple aspects of his business identity specified as:

secretary.john_.doe@example.com
personal.john_doe@example.com
voice-mail.john_doe@example.com
project_3499.john_doe@example.com This change in convention effectively creates an entirely new model of how telephony features operate in converged voice and data systems. As indicated above, according to this invention, features operate with an understanding of the current user context and communications are directed to the most appropriate aspect of the user identity. Thus, for example, calling parties can indicate which aspects of the identity they wish to contact and which aspects they do not wish to deal with.

Figure 2:
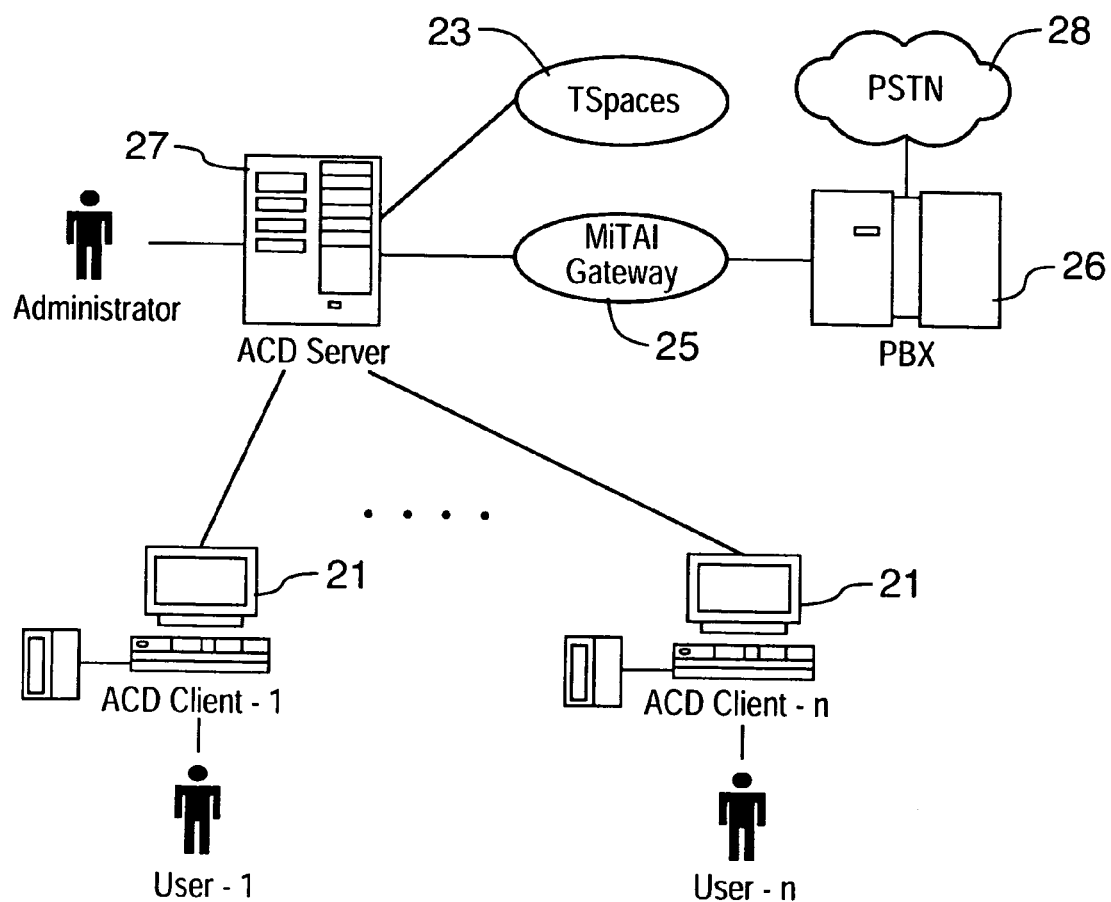
FIG. 2 is a block diagram of a hardware implementation of the Internet telephony system according to a preferred embodiment of the invention.

An exemplary hardware implementation of the system according to the present invention is shown in FIG. 2. The system is based on a client-server architecture. An Active Call Delivery (ACD) client 21 communicates with an ACD server 27 which, in turn, communicates with TSpaces server 23 and a MiTAI Gateway server 25. MiTAI Gateway server 25 provides access via a PBS 26 to the PSTN 28. ACD server 27 is a single server or multiple servers having access to the TSpaces server 23. The ACD server 27 consists of user interfaces and a collection of "system agents" discussed in greater detail below. The user interfaces provide an introduction window, a login window for a system administrator, a context window for managing a hierarchy of contexts and a call simulation window for simulating a phone call. Each system agent contributes to call processing and has its own responsibilities: a Relationship Assigning (RA) agent is responsible for acquiring the relationship between a caller and a receiver, and assigning it to a relevant data field for call processing. A User Rule Assigning (URA) agent is responsible for extracting all of the matching user rules according to the conditions of each rule and the current context, and assigning them to a relevant data field for call processing. A User-rule Conflict Resolving (UCR) agent is responsible for resolving any conflict that might be present in the assigned rules. As indicated above, these agents do not have to be installed on a particular machine, but can be distributed over a network of machines, which have access to the TSpaces server 23.

The ACD client 21 consists of user interfaces and user agents. The user interfaces provide an introduction window, a login window for a registered system user, and a registration window for a new user. Knowledge management is an important part of the user interface on the client system. A user can create or manage personal information such as a buddy list, relationship information, a schedule and a user preference rule. The client server utilizes two types of agents: The Call Delivery (CD) agent and the System Management (SM) agent. The CD agent acknowledges events, which are generated by the Call Monitor, in the Tspaces server 23. The Call Monitor is a direct interface with the MiTAI Gateway 25, and creates an event that is fed into the TSpaces server 23 for starting call processing by the CD agent. Next, the SM agent acknowledges the event from the CD agent, and distributes the call processing to agents on the network. Although each agent has distinct services, both the server and the client have certain common modules as per customary object-oriented design. These common object modules and the other modules are explained below.

Figure 3:
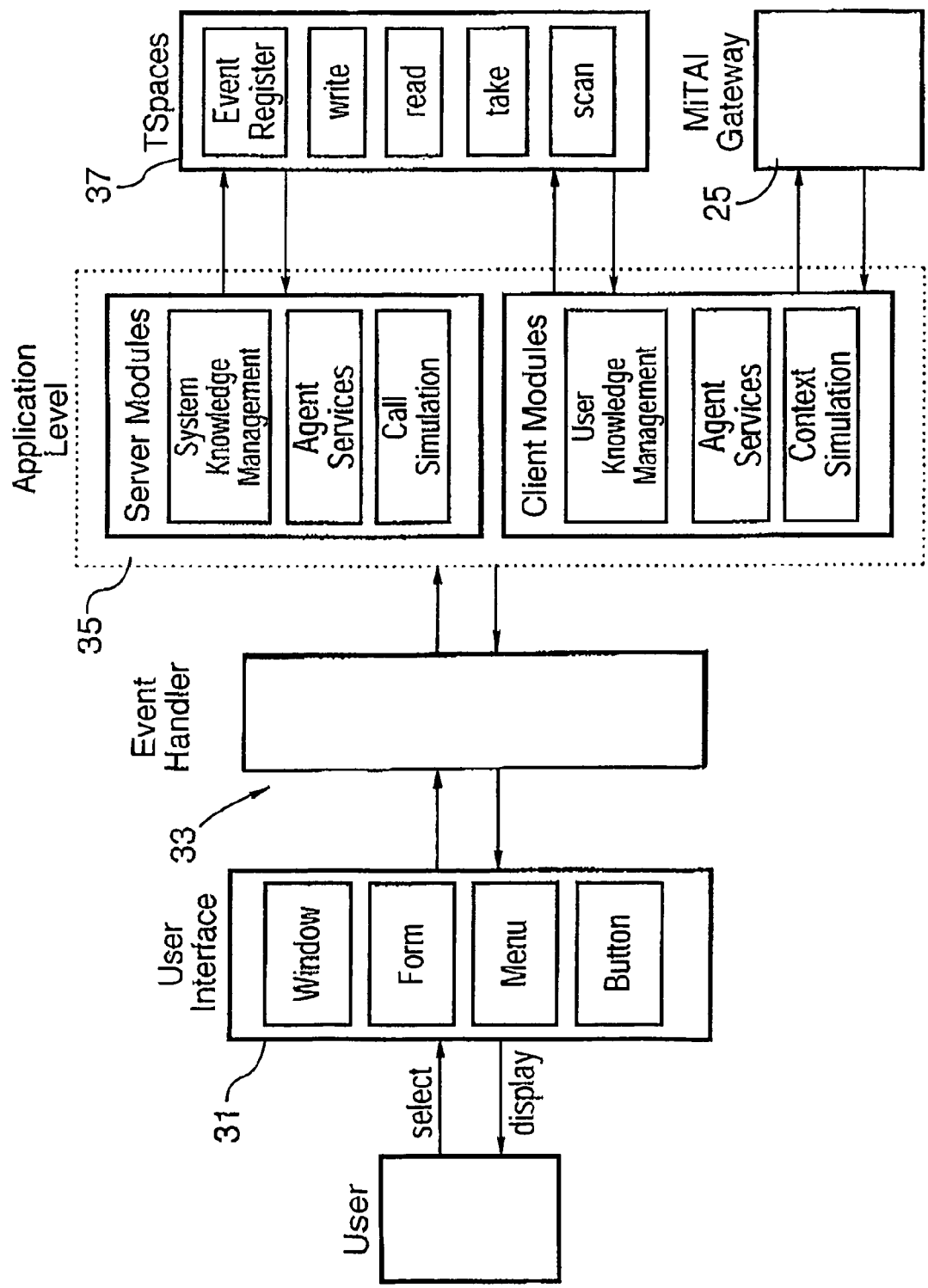
FIG. 3 shows the system architecture and module interactions for the Internet telephony system of FIGS. 1 and 2.

FIG. 3 shows the system architecture and module interactions for the Internet telephony system of FIGS. 1 and 2. The user interface 31 consists of windows, forms, menus and buttons for providing user login, registration, user preference rule setting, context simulation, and a display of messages for assisting the user.

The Event Handler subsystem 33 is a monitoring daemon that resides between the user interface 31 and the Application Level subsystem 35. It waits for physical events to arrive from the user interface 31, such as mouse clicks, and directs them to the appropriate application module. The development tool, Java, provides embedded event handlers, such as ActionListener, for this purpose.

The Application Level 35 is the core of the system. It consists of multiple agents that provide services for a client as well as for a server. All of the system transactions, functionalities, and knowledge management are performed within this subsystem.

Figure 4:
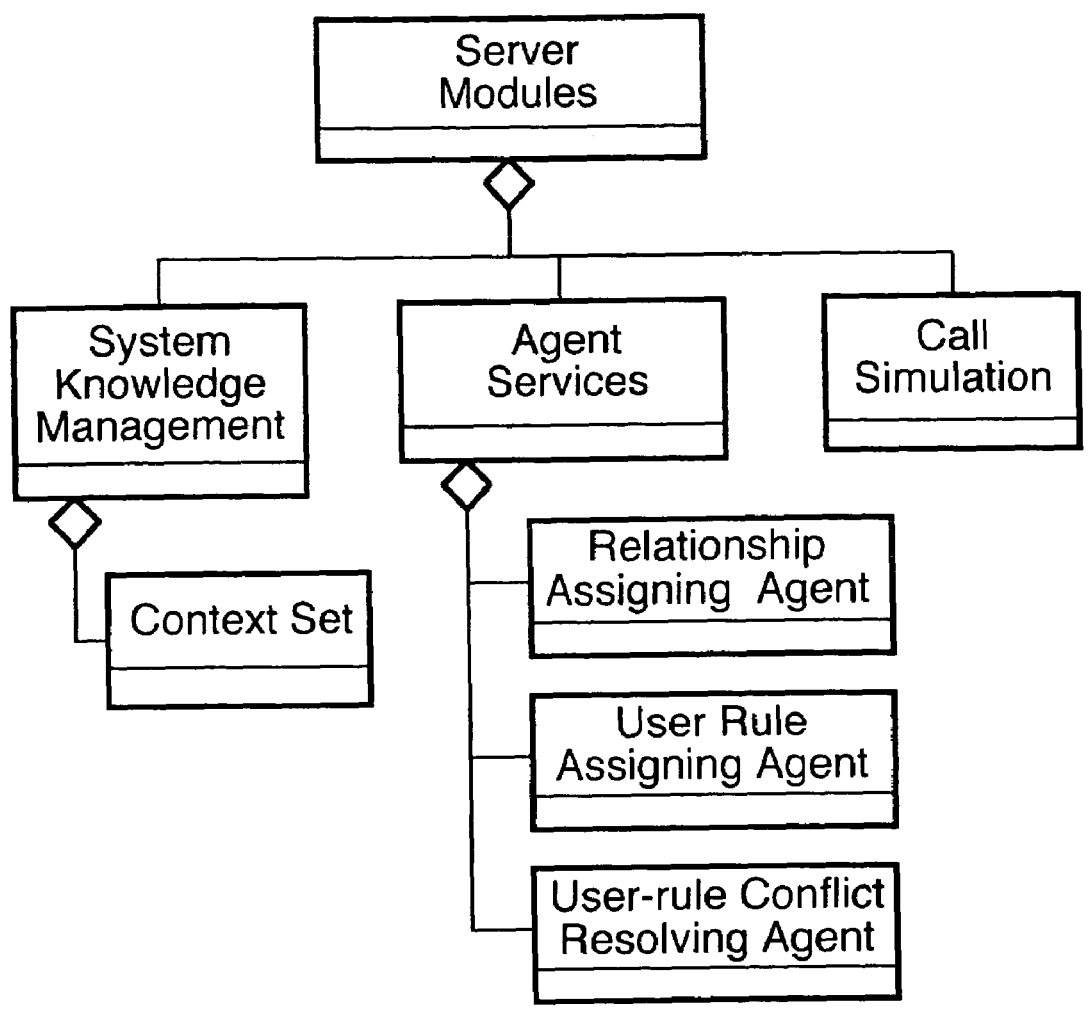
FIG. 4 is a class diagram for the server modules of FIG. 3.

As shown in the class diagram of FIG. 4, the server modules are divided into three major parts: System Knowledge Management, Agent Services and Call Simulation. The System Knowledge Management module includes a Context Set sub-module to allow an authorized administrator to create or modify a context hierarchy such as location and activity. The Agent Services module consists of three distinct agent modules: The Relationship Assigning (RA) agent, the User Rule Assigning (URA) agent, and the User-rule Conflict Resolving (UCR) agent. In order to give flexible implementation of the agents, status of the agents is managed in order to know their availability. Network connectivity may affect their availability. Therefore, both an agent and the connection between the agent and the system's TSpaces 37 (FIG. 3) must be functional in order to use the agent. The system acquires agent's status by examining a corresponding status tuple in the TSpaces 37. The status tuple consists of "name", "priority" and "availability" fields. Each agent is responsible for updating its status tuple in the TSpaces 37. The procedures for updating a status tuple consist of taking the status tuple and rewriting it with new status information once per second. A tuple can be set to expire after a predetermined time. Upon expiration, the TSpaces server 23 removes the tuple from the TSpaces 37. The expiration time for a status tuple is three seconds, so if an agent fails to update the tuple three times consecutively for any reason, there will be no status tuple for the corresponding agent in the TSpaces 37. The system assumes that an agent is abnormal if there is no status tuple for the agent, or if the "availability" field in the status tuple is set as "abnormal". The time gap between the one-second it takes to update the status tuple and the three seconds allowed before the status tuple expires may prevent unnecessary status toggling by temporal network disturbance.

Each agent is also responsible for registering an event into the TSpaces 37 to communicate with client machines. Whenever an awaited tuple is written into the TSpaces, the TSpaces server 23 notifies this to an agent that registered the event. Generating an event and getting notification of the event from the TSpaces 37 forms a two-way communication-acknowledgement between agents.

The Relationship Assigning (RA) agent is responsible for responding to a relationship-assigning request from a client's SM agent. The request from a SM agent contains caller and receiver information. The RA agent assigns the relationship between the user and the caller according to the user's buddy-list.

The User Rule Assigning (URA) agent is responsible for responding to a user-rule-assigning request from a client's SM agent. Upon request, the URA agent retrieves both the relationship information and the user's current contexts. The relationship information is a relationship between the caller and the receiver, set by the RA agent. The user's current contexts are the user's location, the current time with the user's schedule, and the user's activity.

Who is calling?
Where is the user?
What the user is doing?
When is it?

The User-rule Conflict Resolving (UCR) agent is responsible for responding to a client's SM agent for the user-rule conflict-resolving request. The request contains user rule information that is assigned by the URA agent. The UCR agent selects one rule that is the most specific among the assigned rules. The more conditions a rule has, the more specific a rule is considered to be. The Call Simulation service is provided for testing without connecting to a MiTAI Gateway 25. A window with a form serves this functionality.

Figure 5:
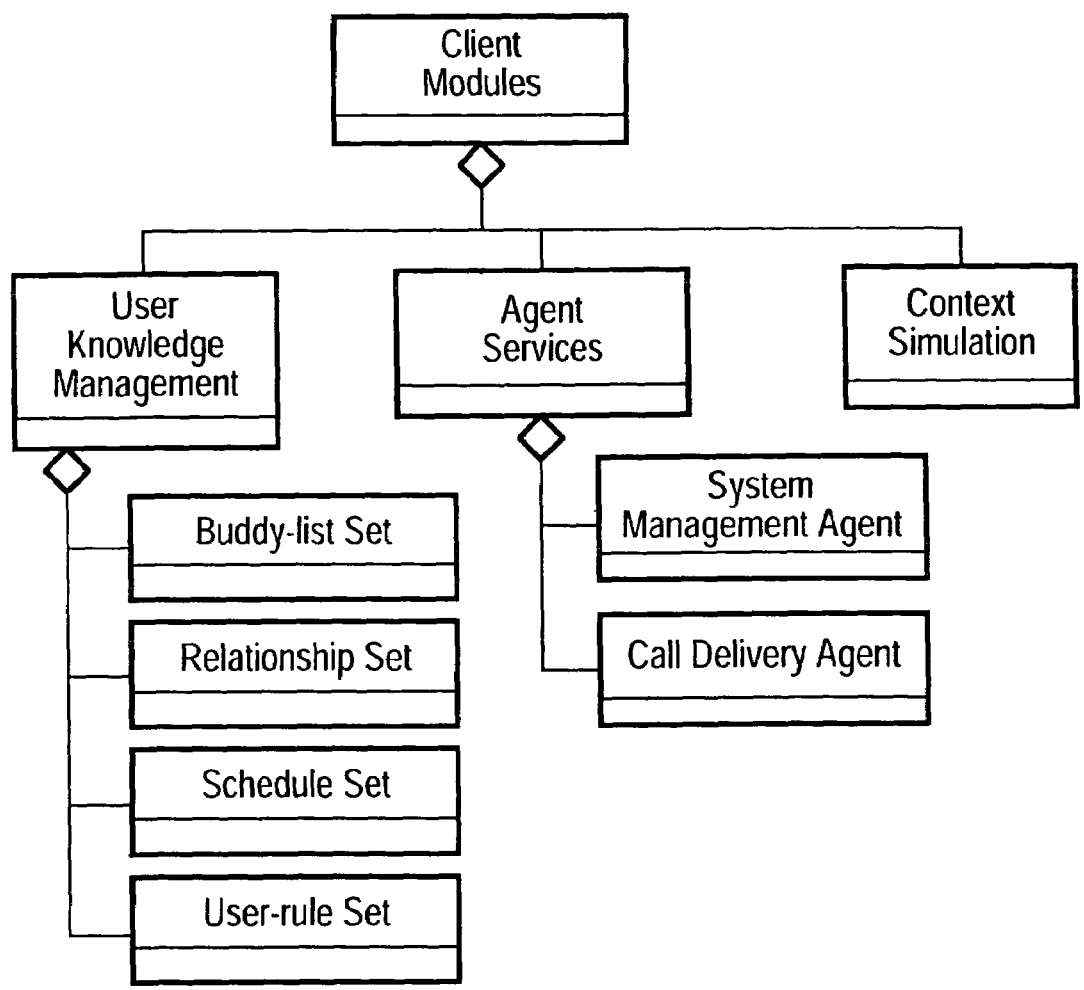
FIG. 5 is a class diagram for the client modules of FIG. 3.

As shown in the client module class diagram of FIG. 5, the client modules are divided into three subsystems: User Knowledge Management, Agent Services, and Context Simulation. A user can manipulate personal knowledge through the User Knowledge Management module.

The Call Delivery (CD) agent is responsible for communication with the phone switch or PBX 26 through MiTAI Gateway 25. In particular, the CD agent registers events to MiTAI Gateway 25 and waits for the notification of an incoming call for a user. When the notification arrives, the CD agent sends a request to the SM agent for further processing and waits for response. This response from the SM agent contains an action to be taken as a result of an entire call processing. Then the CD agent is responsible for requesting the selected action to the MiTAI Gateway 25.

The System Management (SM) agent is responsible for managing other agents' status and sequencing call processing according to the system agents' priority. When the CD agent requests call processing, the SM agent scans the agents' status tuples in the TSpaces 37 and makes a sequence table according to their priority. It sends a processing request to the highest-priority-agent, waits for a response and then sends it to the next-highest-priority-agent. When the SM agent receives a response from the lowest-priority-agent, it sends an information tuple back to the CD agent.

The Context Simulation module serves as a context agent that dynamically detects, interprets and updates the user's current contexts. A Context Simulation window includes all of the possible contexts, which are set by a system administrator, and a user selects from them.

TSpaces 37 (i.e. tuple spaces), are implemented in one or more servers 23 as a network communication buffer with database capabilities. A more complete description of TSpaces 37 may be found in http://www.almaden.ibm.com/cs/TSpaces/, and in co-pending UK Patent Application No. 9920051.1. TSpaces 37 enable communication between applications and devices in a network of heterogeneous computers and operating systems. TSpaces 37 provides group communication services, database services, URL-based file transfer services, and event notification services. The TSpaces 37 are implemented in the Java programming language and thus automatically possess network ubiquity through platform independence, as well as a standard type of representation for all data types. The TSpaces system is appropriate for any application that has distribution or data storage requirements. It can perform many of the duties of a relational database system without imposing an overly restrictive (and primitive) type system, a rigid schema, a clumsy user interface or a severe runtime memory requirement. In the present invention, the TSpaces Server 23 is the medium between the system and user knowledge stores. However, it will be understood that Tspaces 37 may be replaced by a relational database or other shared database providing equivalent functionality for managing knowledge transactions, including read, write, update, take and scan, as well as event handling, such as registration and notification of events.

The MiTAI Gateway 25 facilitates communication to the MITEL telephony servers (i.e. PBX 26) for processes that are not based on the "C" development language. A description of the MiTAI Gateway 25 may be found in Ramiro Liscano, "MiTAI Gateway", *MITEL Networks*, June 2001. The MiTAI Gateway 25 is a Windows based process that can be executed on any Windows platform. It can manage a single socket connection from any other process on a network and it supports a limited session protocol.

The MiTAI Gateway Server 25 is the intermediate system between the PBX 26 and the ACD's Application Level subsystem 35. The Application Level subsystem 35 registers an event to the MiTAI Gateway server 25 for the purpose of monitoring incoming calls.

In terms of system topology, the User Interface 31 is built on a Windows Platform, and it interacts with the Application Level 35 through an Event Handler 33. The Application Level 35 subsystems use TSpaces server 23 as the medium for communication and for accessing the System Knowledge Management of the server and clients.

All of the knowledge, which includes user information, user rules, the user's current context information, and call information, is stored in the TSpaces 37. The unit of storage is a tuple, as set forth in the references cited above, and as discussed in the Appendix to this specification.

User Information consists of basic user information, relationship information, a buddy list, user preference rules and the dynamically varying user's current context information.

User Information is stored in a tuple named "UserProfile" and the structure is as follows:

{"UserProfile", id, user-info, relationship, buddy-list, user-rule, context} where "UserProfile" is the name of the tuple, id is user identification for uniquely identifying a user in the system. The user-info field contains basic user information about the user such as: password, name, phone numbers, and the user's time schedule. The phone numbers are extension phone numbers within the PBX 26, such as my office and secretary's phone numbers (e.g. 4001). This field also contains the schedules of the user. Schedules for lunches and meetings may be input by the user directly or ascertained from another application (e.g. Microsoft Outlook, etc.). The relationship field contains relationship information which is defined by the user in a relationship hierarchy using the user interface. The user can add any person as his "buddy" in a buddy list. The buddy list contains information about such persons including as name and phone number, as well as their relationship to the user. The user-rule field contains a user preference rule. The user creates his/her personal preferences for handling incoming calls via the user interface 31. The conditions in a rule can make use of the contexts, the buddy list and a relationship selected from the relationship information hierarchy. In that regard, the context field contains context information. The context determining parameters, which are used in the system, are location, the user's current activity and the present time. The location and activity contexts have a hierarchy, so that they may have sub-contexts. The current context information of a user can be either a real context or a pretended context set by the user. The real context information is updated by the context agent(s) whereas the pretended context, on the other hand, is set and controlled by the user. The pretended context is designed to override the real contexts if so desired by the user. The hierarchy of the location parameters is defined by a system administrator. Thus, if a location's properties are coupled with the phone number, the system can deliver the user's call to the phone nearest to the user's current location.

There are two kinds of activities that can be defined. Some activities can be automatically detected by the system, whereas others can only be assumed or set by a user. For example, the system is able to know whether the user is 'on the phone', but it is difficult to judge if the user is 'busy at work' or 'having a break'. Therefore, detectable activities are updated by the system automatically, and others are set by the user. A receiver's time context is set according to his time schedule. For example, if the user's lunchtime is scheduled from 12 p.m. to 1 p.m., the system can assume that the user is having lunch during that time period.

Call information is contained in a tuple that an agent shares to communicate with other agents for processing an incoming call. Therefore, it contains all of the necessary data fields for caller information and user preference rules. Agents take the "Call" tuple from the TSpaces 37 and update it according to their responsibility. For example, the RA agent assigns relationships between the caller and the receiver, the URA agent assigns all the appropriate user rules, and the UCR agent resolves user rule conflict by selecting only one user rule. The form of this tuple is:

{"Call", dest-agent, source-agent, id, call-info, user-rule} where "Call" is the name of the tuple, dest-agent is the destination agent that is expected to receive this tuple, the source-agent field identifies the source agent that sends this tuple, the id field is user identification, and the call-info field contains basic information of both the caller and the receiver such as phone number, name and relationship information between them. The user-rule field matches user rule(s) assigned by the agents. The "Call" field and the dest-agent field are used when agents register an event in the TSpaces server 23. The following is a part of the SM agent event registration routine to the TSpaces server 23:

Tuple template=new Tuple("Call", "SMAgent", new Field (String.class),
id, new Field(String.class), new Field(String.class),
new Field(String.class));
seqNum=ts.eventRegister(TupleSpace.WRITE, template, this, newThread);

It requests the TSpaces server 23 to notify the SM agent when a tuple is posted where the first field is "Call", the second is "SMAgent", and the fourth is user id, and where the third field is 'new Field(String.class)' which means that any value will be acceptable for this field.

Figure 6:
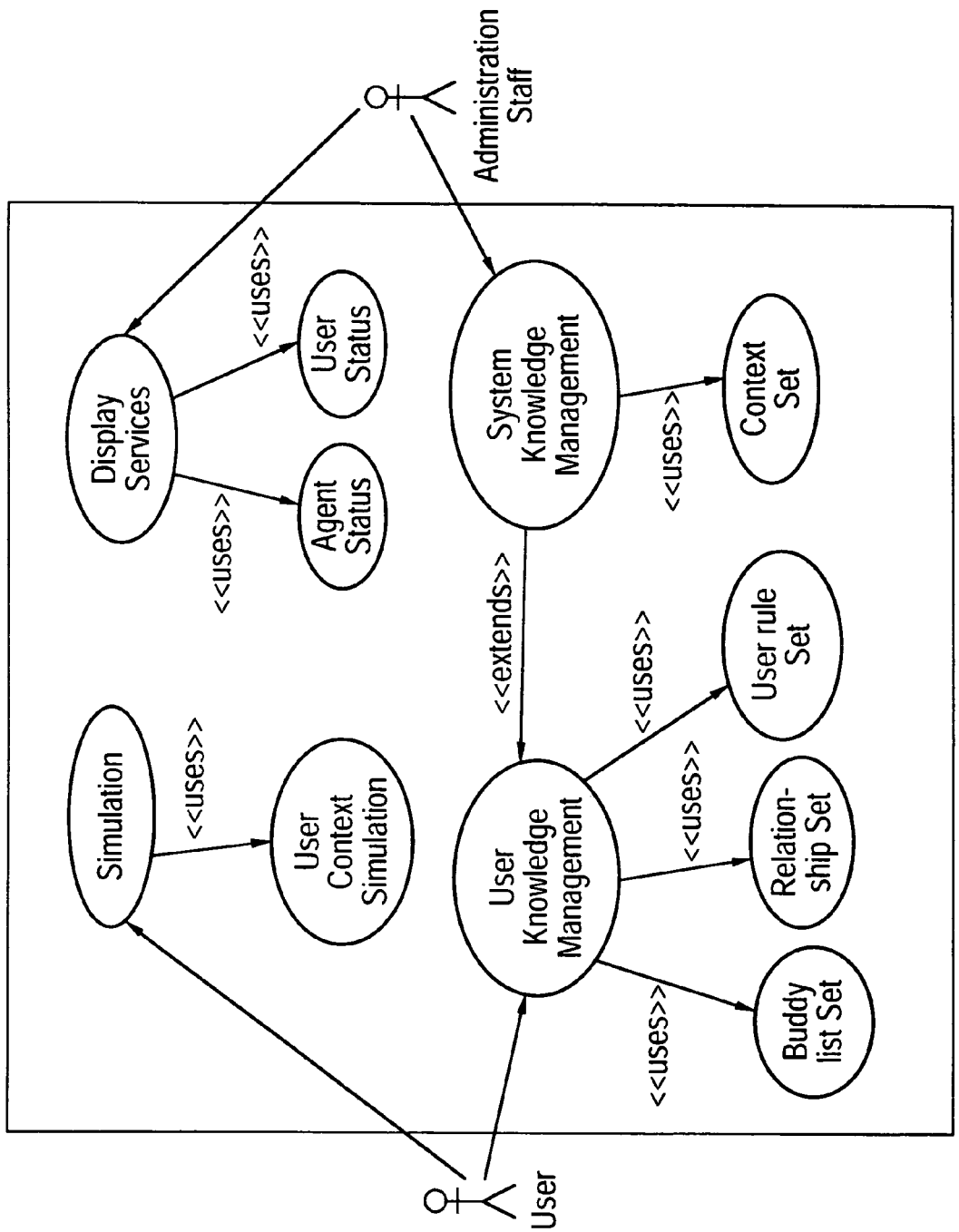
FIG. 6 is a use case diagram of the system according to the present invention with corresponding actors.

Module interactions show the behavior of the classes, the modules, and the system as a whole. They describe how the components of the system interact by message passing, function calls, and by sharing the state information. The components interaction for the present invention are shown in the use case diagram and a state chart diagram of FIGS. 6 and 7, respectively, using Unified Modeling Language (UML) notation.

Figure 7:
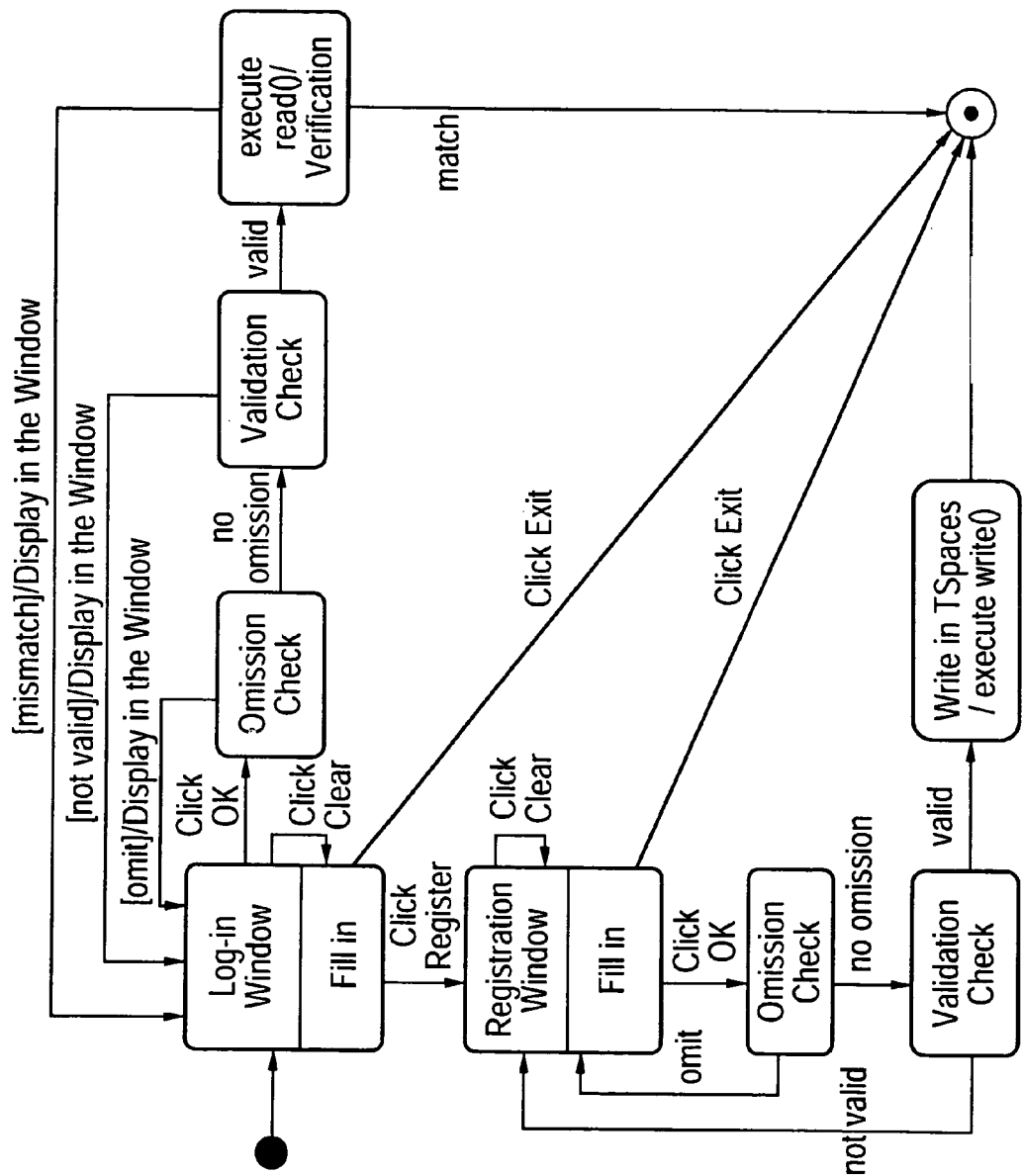
FIG. 7 is a state chart diagram for user login and registration to the system according to the present invention.

In order to use the system, including the server system for administrators and the client system for users, a person must be authorized. First time users register by clicking the "Register" button in the "Log-in Window", as indicated in FIG. 7. Registering users provides crucial information for using the system such as user-ID, password, name and phone numbers. Every field is filled in without omission before clicking the "OK" button for submitting. Once it is submitted, the system checks validation, such as whether each field has the correct length and is meaningful. The user-ID should be less than 10 alphabetic characters; the password should be less than 10 numbers and/or letters. The name field should be less than 20 characters and phone number fields allow only numbers. If the "Validation Check" stage in FIG. 7 is successful, the system writes information to the TSpaces 37 by executing the "write( )" operation. The user registration processes are finished when the system successfully writes the user's information into the TSpaces.

Registered users and administrators need to be authenticated before using the system. The fields for user ID and password in the "Log-in Window" have to be correctly filled in, and then the "OK" button clicked. If both fields are filled without omission, the system checks validation of each field. This validation procedure is the same as it for the user registration. The validated user-ID and password pair should be matched with those in the Tspaces 37. The system obtains the information by executing the "read( )" operation and comparing them. The login processes are finished when either the user clicks the "Exit" button or there is a match between the input user ID and password pair and the pair already in the Tspaces 37.

A prototype of the ACD system of the present invention has been implemented using the Java programming language on a Windows NT platform, with the following packages used for the implementation:

The Java 2 Platform, Standard Edition v1.3.1, for a Java development environment The TSpaces v2.1.2 as a data repository and a communication medium between agents Mitel Telephony Application Interface (MiTAI) for the PBX interface The details of the system's installation and execution method include unpacking the Java class files and executing them, as well as other server initiation processes which would be well known to a person of skill in the art.

Figure 8:
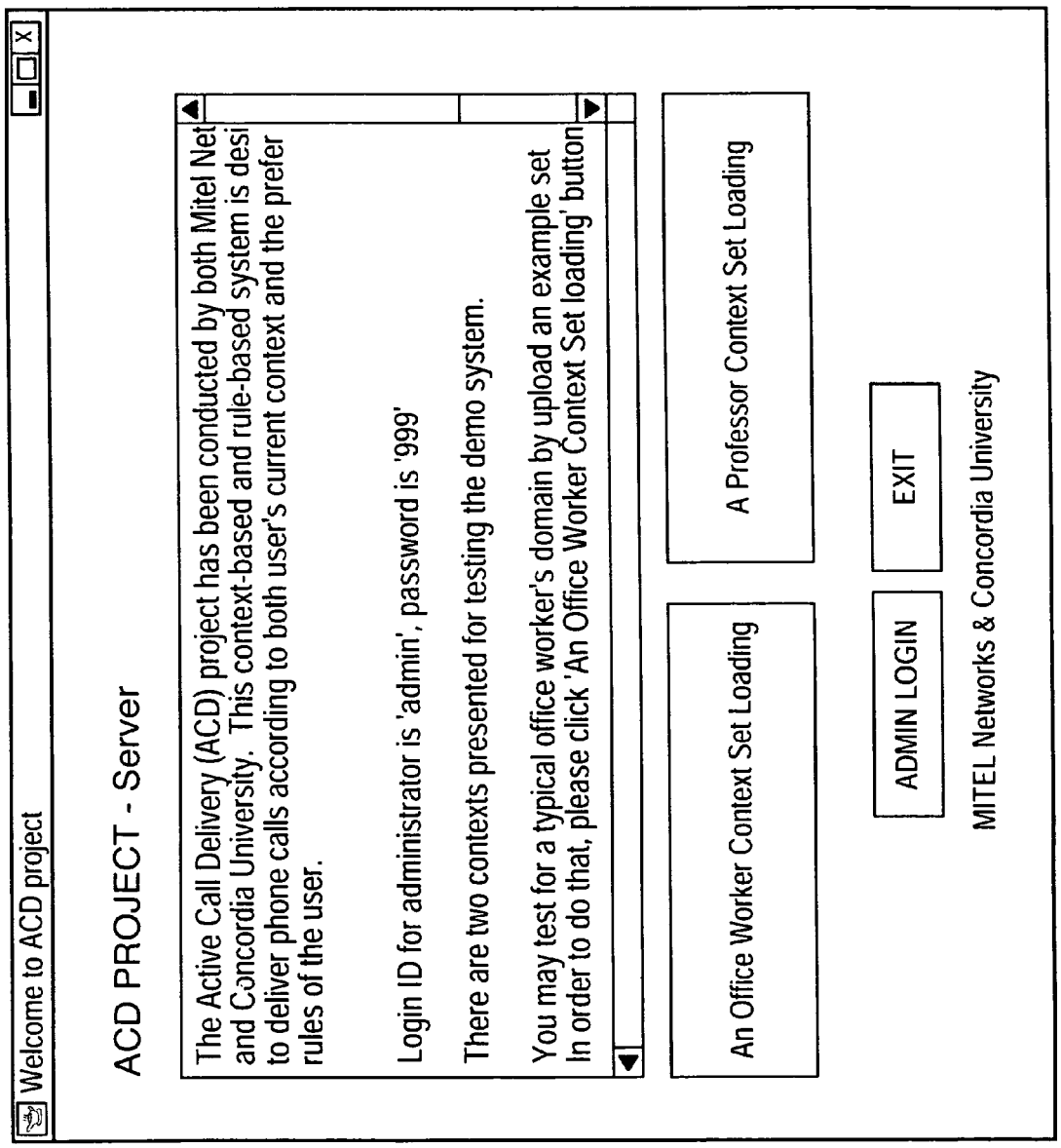
FIG. 8 is a server welcoming window displayed to the user during operation of the system according to the present invention.

The design of the ACD system is not restricted to any specific domain of users. A flexible method of defining knowledge for a user domain allows the system to be used in different domains. A system administrator can define a hierarchy of the user's location, activity and time according to a domain of target users. For the purposes of the successful prototype of this invention, the system provides two example domains: an office worker's domain and a professor's domain. A user may choose one of the two domains by clicking the corresponding button in the introduction window, as shown in FIG. 8. It sets up the necessary knowledge such as the hierarchy of possible locations, the relationship information and the buddy-list automatically.

Figure 9:
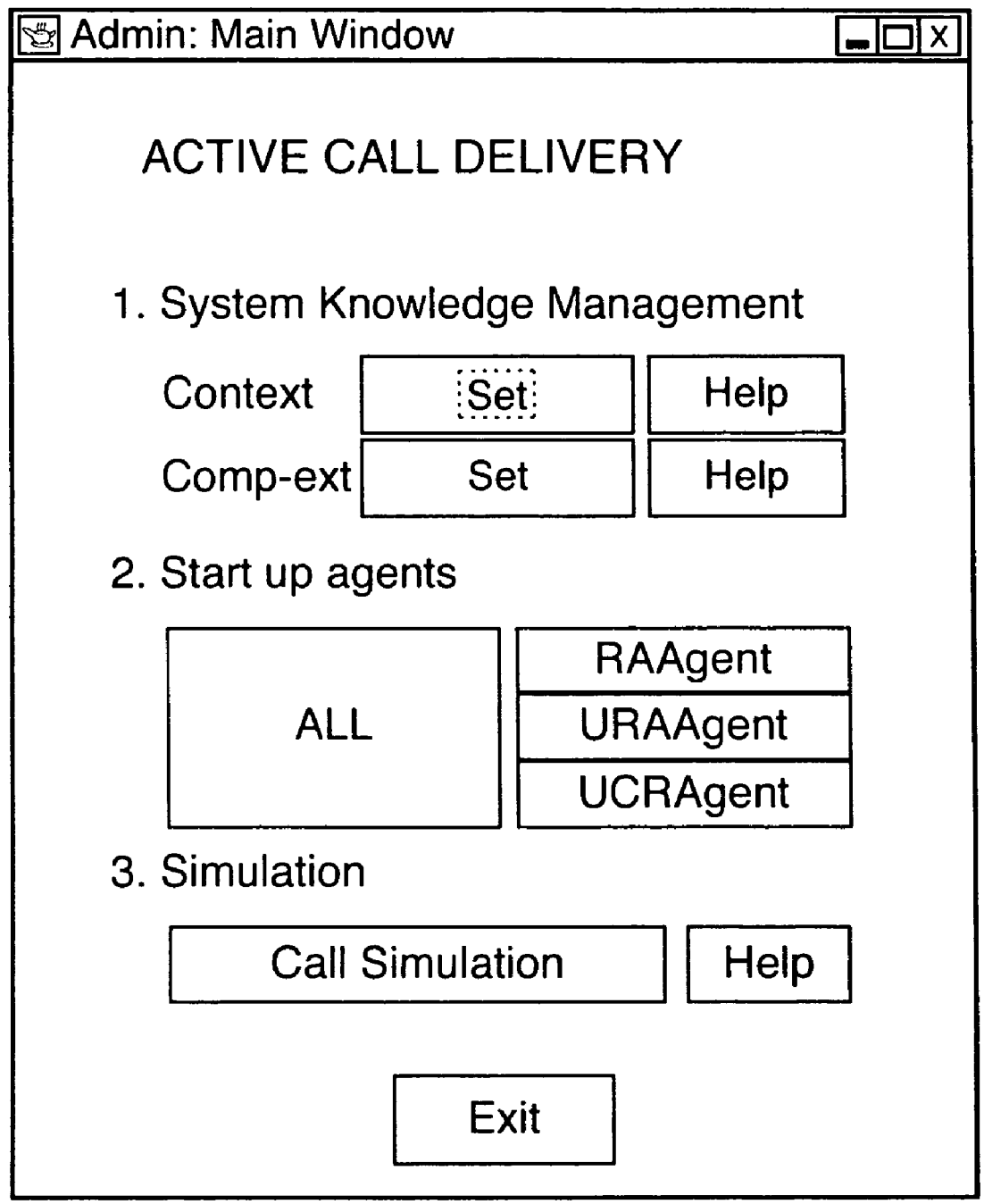
FIG. 9 is the server main window displayed to the user during operation of the system according to the present invention.

The ACD server system 27 is designed to be simple and easy to use. Having connected to the TSpaces Server 23, the installation procedure for the ACD server system 27 requires unpacking the Java class files and executing them on any machine on the network. At the start, a welcoming window provides brief information about the ACD system, administrator login information, and two buttons to load information for testing purposes: "An Office Worker Context Set Loading", and "A Professor Context Set Loading", as shown in FIG. 8. When "An Office Worker Context Set Loading" button is clicked, example contexts for an office worker are written into the Tspaces 37. This model of the hierarchy of location and activity is shown in FIG. 9. For testing an example of the professor's domain, "A Professor Context Set Loading" can be selected. A tester can start the server without selecting a pre-defined set of information for testing a customized context. The server system informs the tester that a hierarchy of context should be either selected from the two choices or set manually when a tester skips information loading. "ADMIN LOGIN" and "EXIT" buttons are self-explanatory.

Figure 10:
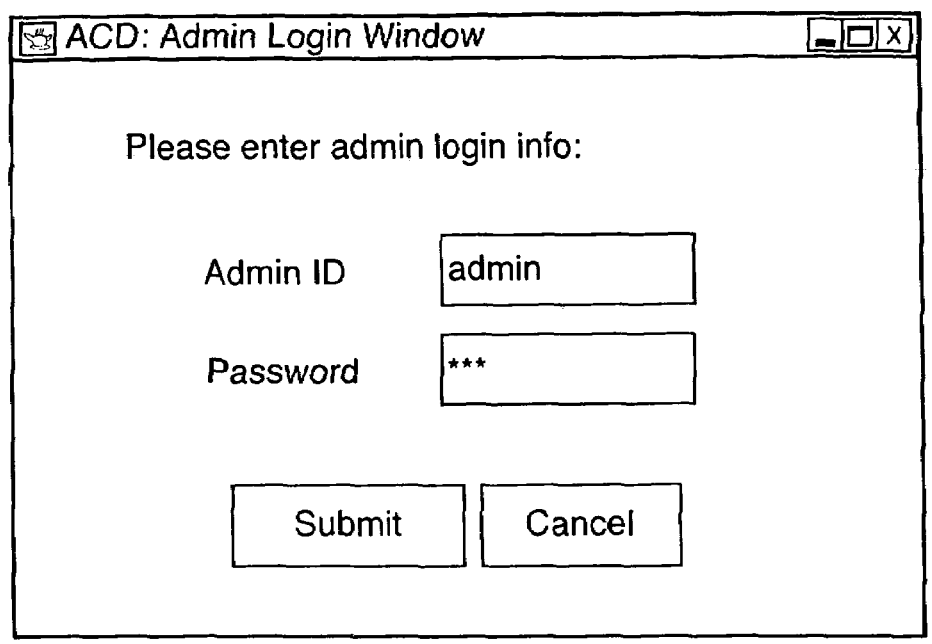
FIG. 10 is an administrator login window displayed to an administrator during operation of the system according to the present invention.

To login as an administrator, who controls knowledge and services for the server, the user is authenticated through the login window for an administrator as shown in FIG. 10. An error message window is presented if a field is omitted or there is a mismatch between Admin ID and Password.

Figure 11:
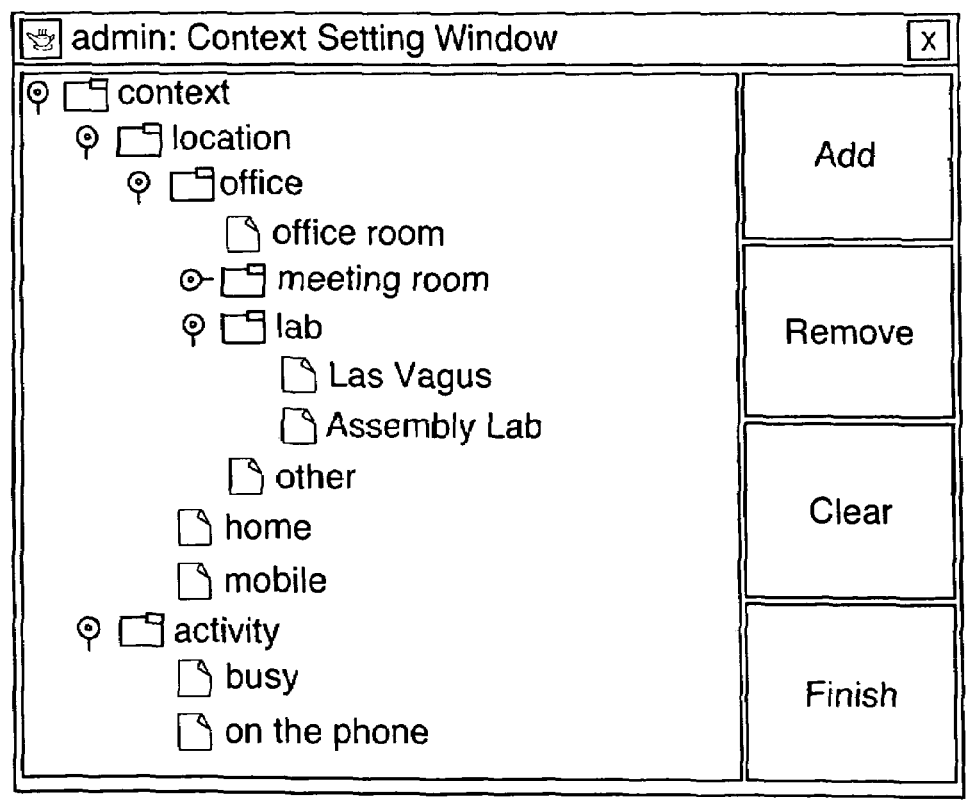
FIG. 11 is a context setting window displayed to the administrator during operation of the system according to the present invention.

Once the login is authorized, the Server Main Window is presented for further processing, as shown in FIG. 9. In establishing System Knowledge Management (FIG. 3), context setting must first be performed to construct a context hierarchy before a client system provides user services. Clicking the "Set" button of a "Context" (FIG. 9) allows the administrator to set a hierarchy of contexts using the GUI. The pre-defined roots of the context hierarchy for this system are location and activity. Time is another context used in this system, but it is personalized based on a particular user's schedule. Therefore, each client system manages it's own time context. The context window, with an example location hierarchy and activity, is shown in FIG. 11. To add a new sub-context, the administrator clicks one of contexts in the hierarchy and clicks the "Add" button. A new "child" context is thereby added with the default name "New Node n". Clicking twice on the name renames the context. To remove a node, the administrator clicks the node to be removed and clicks the "Remove" button. Clicking the "Clear" button clears all the nodes from the context tree. To save changes and finish modifying, the administrator clicks "Finish".

Figure 12:
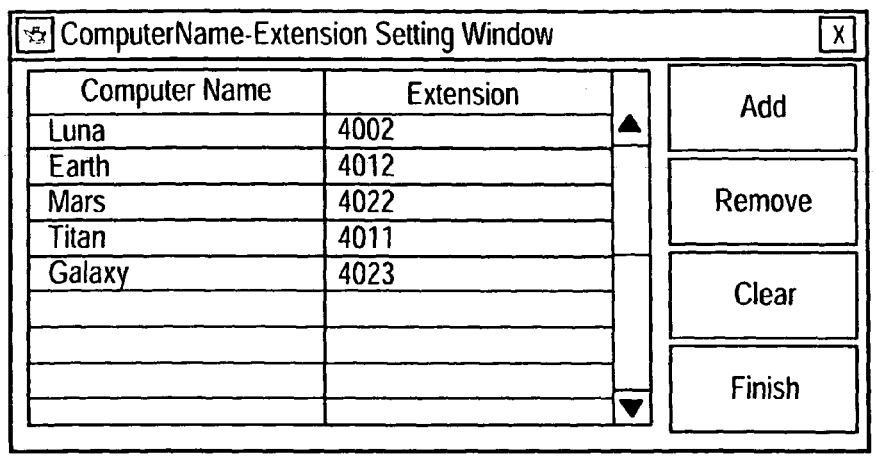
FIG. 12 is a computer name and extension number setting window displayed to the administrator during operation of the system according to the present invention.

Returning to FIG. 9, a computer name and a phone number are paired and saved in order to forward an incoming call. In ACD system 27, this information is used when the delivery action of matching user preference rule is "Forward it to where I am" or when the user wants to forward an incoming call to a different phone. An administrator can add, remove and change the information by clicking the "Set" button for "Comp-ext", which results in display of the table shown in FIG. 12.

Figure 13:
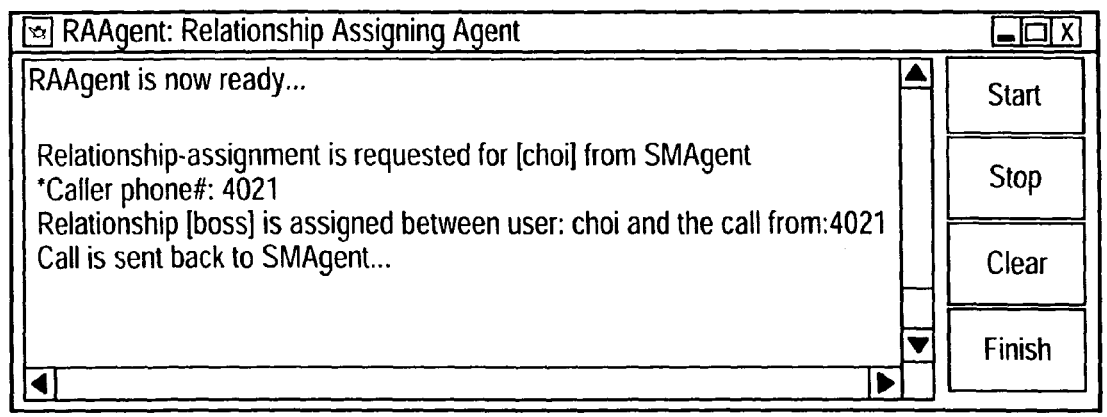
FIG. 13 is a relationship assigning agent window displayed to the administrator during operation of the system according to the present invention.
Figure 14:
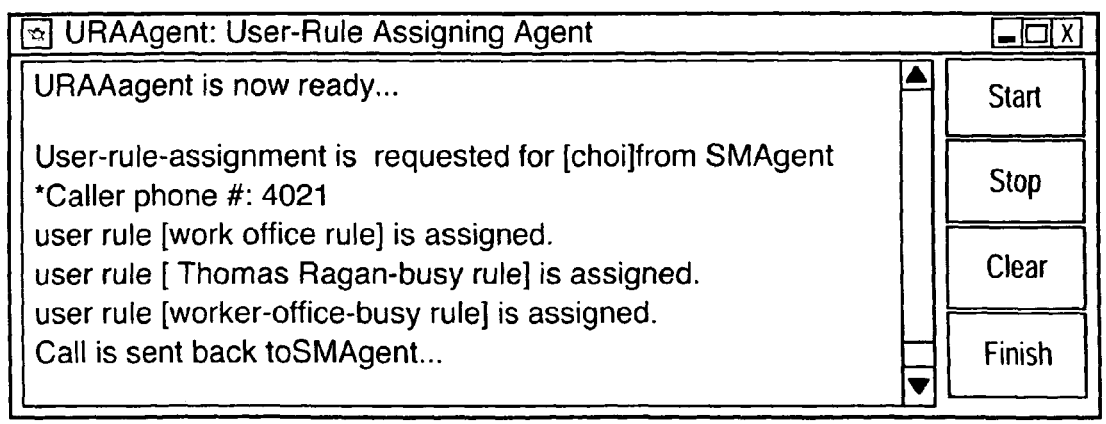
FIG. 14 is a user rule assigning agent window displayed to the administrator during operation of the system according to the present invention.
Figure 15:
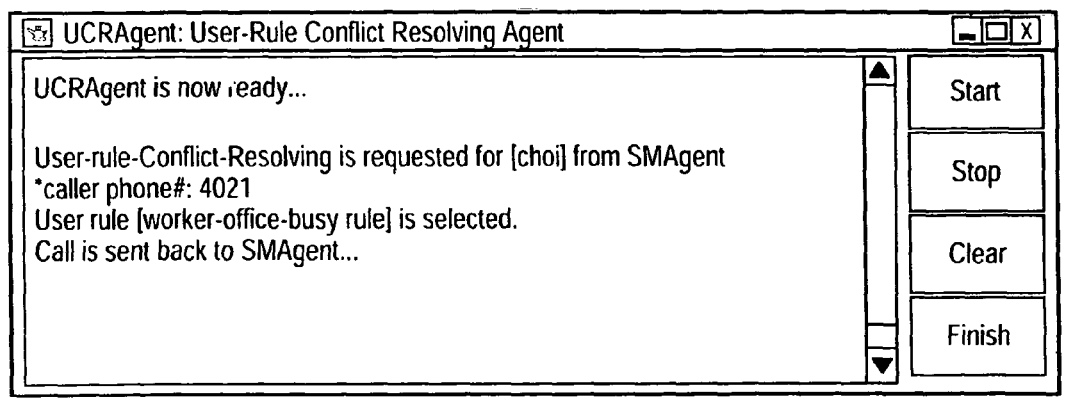
FIG. 15 is a user-rule conflict resolving agent window displayed to the administrator during operation of the system according to the present invention.

The server agents can be executed on any machine that has access to the TSpaces server 23. This means that any machine within the network can be used to execute a server agent. This design gives a flexible distribution of agents. All the agents can be executed together on a given machine by clicking the "ALL" button (FIG. 9), or each agent can be executed separately either on the same machine or on different machines within the network by clicking the corresponding button. Due to network constraints, each agent should report its status regularly by writing its status tuple once per second, where the lifetime of the tuple is three seconds. The details of status management for the server agents are set forth in detail above with reference to FIGS. 4 and 5. Each agent has a display window and four buttons to control it, as shown in FIG. 13, 14 and 15. Clicking the "Start" button starts a corresponding agent by activate its status report. The "Stop" button is for de-activating its status report for testing purpose. A maximum of three seconds later, the status tuple for corresponding agent no longer exists in the Tspaces 37 with the result that the clients recognize that the agent is not available. The "Start" and "Stop" buttons are exclusive, in that one is disabled when the other is executing. The "Clear" button clears the display area, and the "Finish" button terminates the corresponding agent.

The Relationship Assigning (RA) agent assigns relationship information between the caller and the receiver based on the user's buddy-list. An example of execution is shown in FIG. 13, wherein a relationship-assigning request from a System Management (SM) agent for a user, who has a user ID "choi", is received. This request comes with the caller's phone number, which is "4021" in this example. The RA agent gets the user's buddy-list from the TSpaces 37 and finds a relationship between the user "choi" and a person who has the phone number "4021". As a result, a "boss" relationship is found. The call control is sent back to the client by writing a tuple with relationship information into the Tspaces 37. This agent may return multiple relationships. For example, a person may be both a friend and a customer. Tuples for both of these relationships will therefore be returned.

The User Rule Assigning (URA) agent assigns all user preference rules that match the conditions of the rules and the user's current context, as shown in FIG. 14. If the condition of a rule is made of information that has a hierarchy, sub-categories are examined. For example, a location condition of a user preference rule is 'If I am in the office'. Sub-locations of the office such as lab, meeting room also satisfy the rule's condition. For example, consider the user "choi" receiving a call from extension number "4021" while he is in the meeting room and he is busy. In the testing scenario, "4021" is Thomas Ragan's phone and he is the user's boss. The matching user preference rules based on his current context, relationship information and the caller are as follows:

Rule Name: Worker-office Rule
   Condition: If a call is coming from [worker] relationship
      And when I am in my [office]
   Action: Put through the call
Rule Name: Thomas Ragan-busy Rule
   Condition: If a call is coming from [Thomas Ragan]
      And if I am [busy]
   Action: Ask the caller what to do
Rule Name: Worker-office-busy Rule Condition: if a call is coming from [worker] relationship
   When I am in my [office]
   If I'm [busy]
Action: Forward it to voice mailbox The names of the assigning rules are displayed as they are matched in FIG. 14. Although these rules are satisfactory for the user's current context, the system needs to select one rule that is most appropriate for the user in order to take an action.

The User-rule Conflict Resolving (UCR) agent selects one user preference rule if there is more than one rule assigned by the URA agent. According to one embodiment of the invention, the UCR selects the most specific among the assigned rules. A rule with more conditions is considered more specific. In the scenario set forth above, the "worker-office-busy rule" is the most specific rule among the assigned rules, and is therefore selected as shown in the FIG. 15. However, if a rule has the same number of conditions, the UCR agent looks for a more specific condition by comparing the depth of the condition item in the hierarchy. (e.g. "Meeting Room" is more specific than "Office"). When the UCR agent is unable to select one rule among conflict rules by either method set forth above, the system selects the most recently created rule. Specifically, when the UCR agent generates a list of selected rule(s) to the Call Delivery (CD) agent via Tspaces 37, the CD agent assumes there is only one rule assigned by the UCR agent, so it only uses the first rule, which is the most recently created rule (the user rules are saved in order of creation by the user, and the list given to the CD agent is sorted in descending order). Alternatively, the UCR agent may always simply choose a rule at random, or randomly choose a rule in the event of a tie among most specific rules.

As discussed above with reference to FIG. 8, when the ACD client starts, the user is presented with a welcoming window. A brief explanation of the project and the testing information are explained on the white text area. Two buttons, the "An office worker info loading" button and the "A professor info loading" button, are used for testing each domain of users. All the necessary personal information for testing the client (user ID, password, user name, phone numbers, hierarchy of personal relationships, the buddy-list table, the time schedule, and user preference rules) are copied into the TSpaces 37 upon clicking the appropriate button. A confirmation window shows feedback of the result of the processing.

Figure 16:
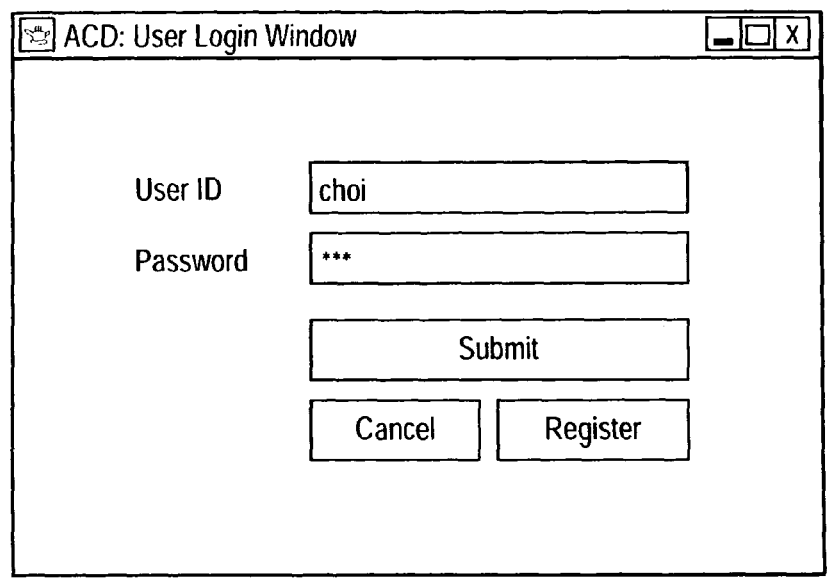
FIG. 16 is a user login window displayed to the user during operation of the system according to the present invention.

During the login process (FIG. 16), the user's ID and password are checked with the information on the TSpaces server 23. If the user is a new system user, registration is effected through the "Register" option. Clicking the "Register" button in the registration window performs validation and verification for each input field. Once a user is logged-in, either through the login window or the registration window, the user name appears on every client window frame as feedback of the user's identification.

A first-time user is prompted to provide basic user information such as user ID, password, name and phone numbers through registration. The input user ID is checked to see if it is not duplicated with existing user IDs. Each field has its own constraints of length and format. An error window notifies the user if any constraint is violated on clicking the "Register" button (FIG. 17).

Figure 18:
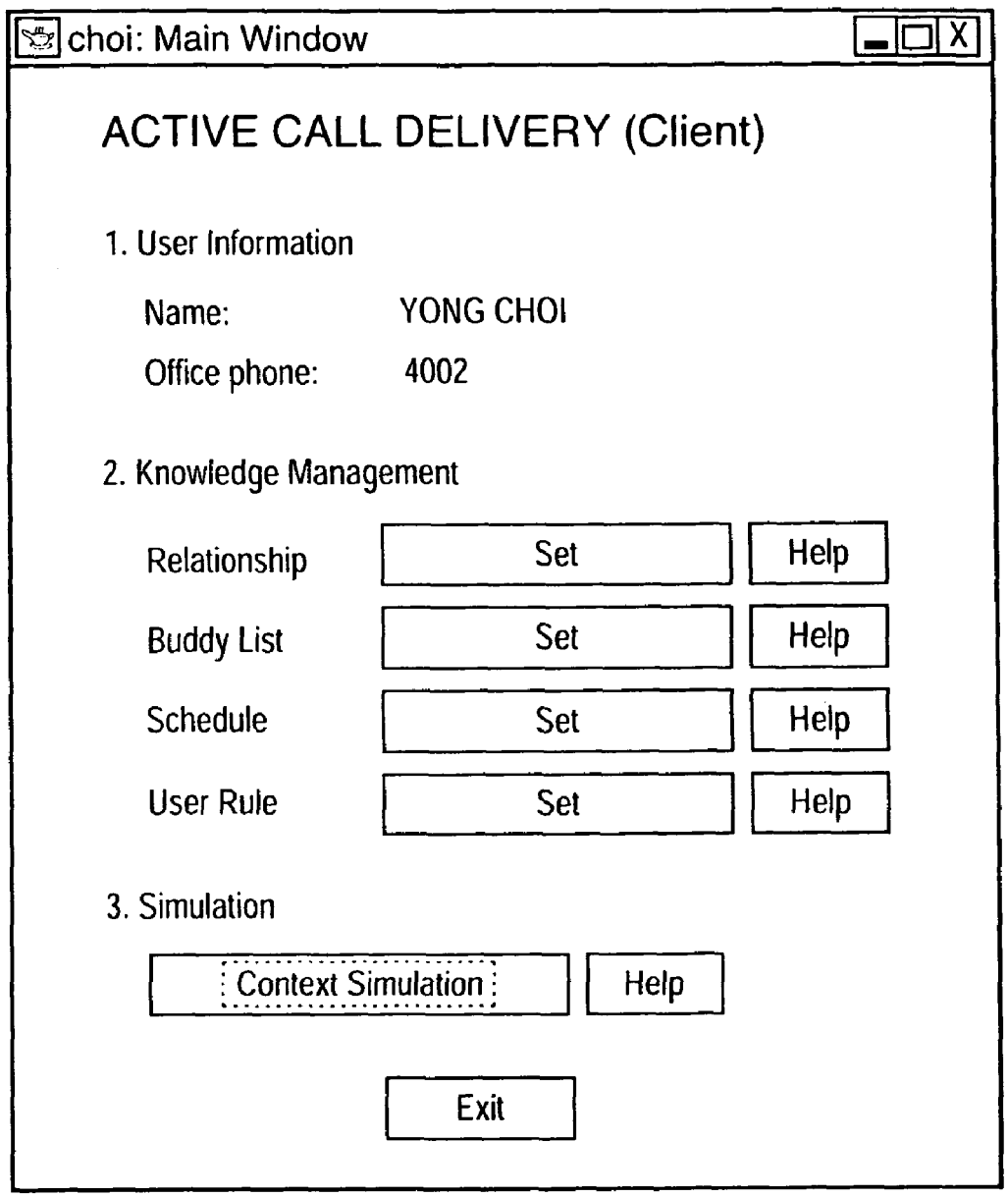
FIG. 18 is a client main window displayed to the user during operation of the system according to the present invention.

The main window for client control is presented if the login or registration process is successful, as shown in FIG. 18. It consists of three parts: User Information, Knowledge Management, and Context Simulation. The basic user information (the user name and the office phone number) is displayed as feedback to the user. The user ID is displayed in the frame of the window. The user can set his personal information such as relationship information, the buddy list, the schedule and the user preference rule through this menu. Each menu has a help button to give a brief explanation of the corresponding item's function.

Figures 19, 20:
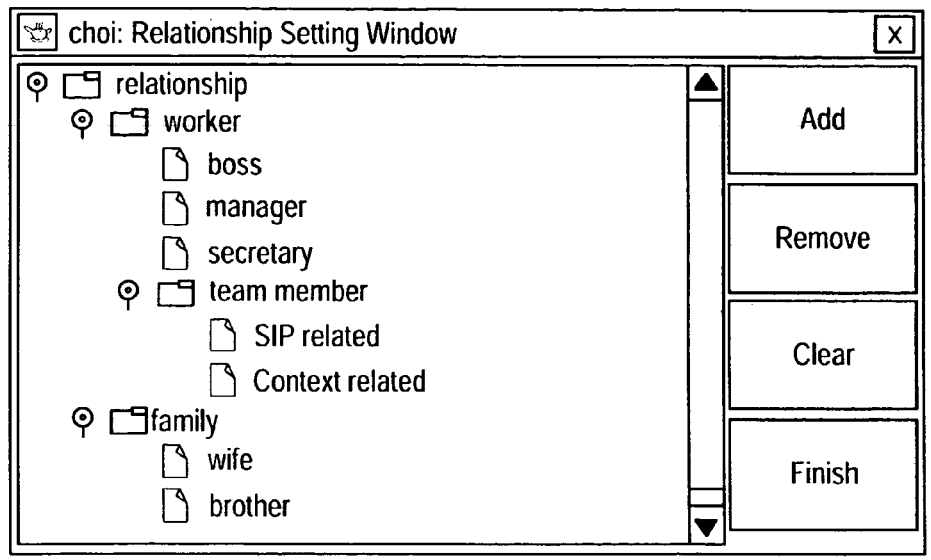
FIG. 19 is a relationship setting window displayed to the user during operation of the system according to the present invention.
FIG. 20 is a buddy-list setting window displayed to the user during operation of the system according to the present invention.

The personal relationship information is shown as a tree structure that is easy to maintain (FIG. 19). To add a new sub-relationship, the user selects one of the relationship nodes and clicks the "Add" button. A new child node is thereby created with a default name, "New Node n", which may be renamed by clicking twice on the name. To remove a relationship, the user selects the removing relationship nodes and clicks the "Remove" button. It should be noted that the sub-relationships that belong to removing relationship are also removed. To remove all of the relationships, the user clicks the "Clear" button to clear all the relationship nodes from the tree. To save changes and finish modifying, the user clicks "Finish".

Clicking any of the fields on the table in FIG. 20 allows the user to make changes to that particular field. To remove a set of buddy information from the table, the user selects a column and clicks "Remove". The modified table is saved into the TSpaces 37 when the "Finish" button is clicked.

Figure 21:
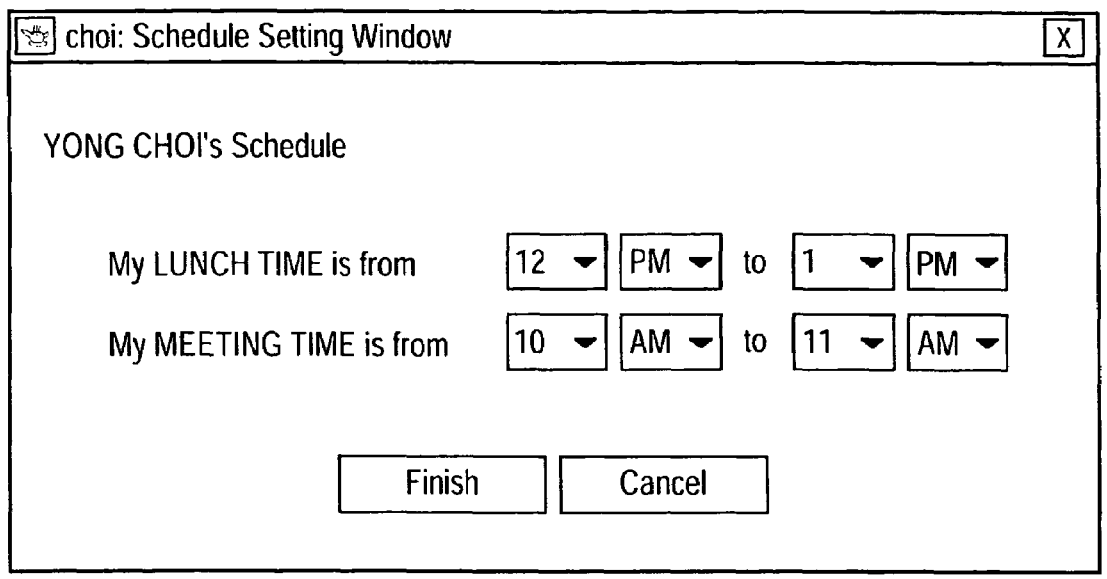
FIG. 21 is a schedule setting window displayed to the user during operation of the system according to the present invention.

As shown in FIG. 21, a user can set two categorized schedules: lunch time and meeting time. When a user creates a new preference rule, these time settings can be referenced as "lunch time" and "meeting time". The user selects the start time and the end time for each schedule from the pull-down menu in FIG. 21. The "Finish" button saves the schedules and removes the Schedule Setting Window.

The user-rule Setting Window consists of three parts: the user rule table, which consists of sequence numbers and user rule names, UI buttons, and a Description window, as shown in FIG. 22. Clicking on one of the rules in the table allows the user to see the description of the selected rule in the Description window. The add, refresh, remove, clear and finish buttons are used for managing rules. The "Add" button is designed for creating a new rule and it takes four steps, which are explained in detail below. By clicking the "Refresh" button newly created rules are shown in the user rule table. To remove an existing rule, the user selects a deleting rule on the table and clicks the "Remove" button. To remove all the existing rules, the user clicks the "Clear" button. To finishing editing, the user clicks the "Finish" button to save any changes.

Figure 23:
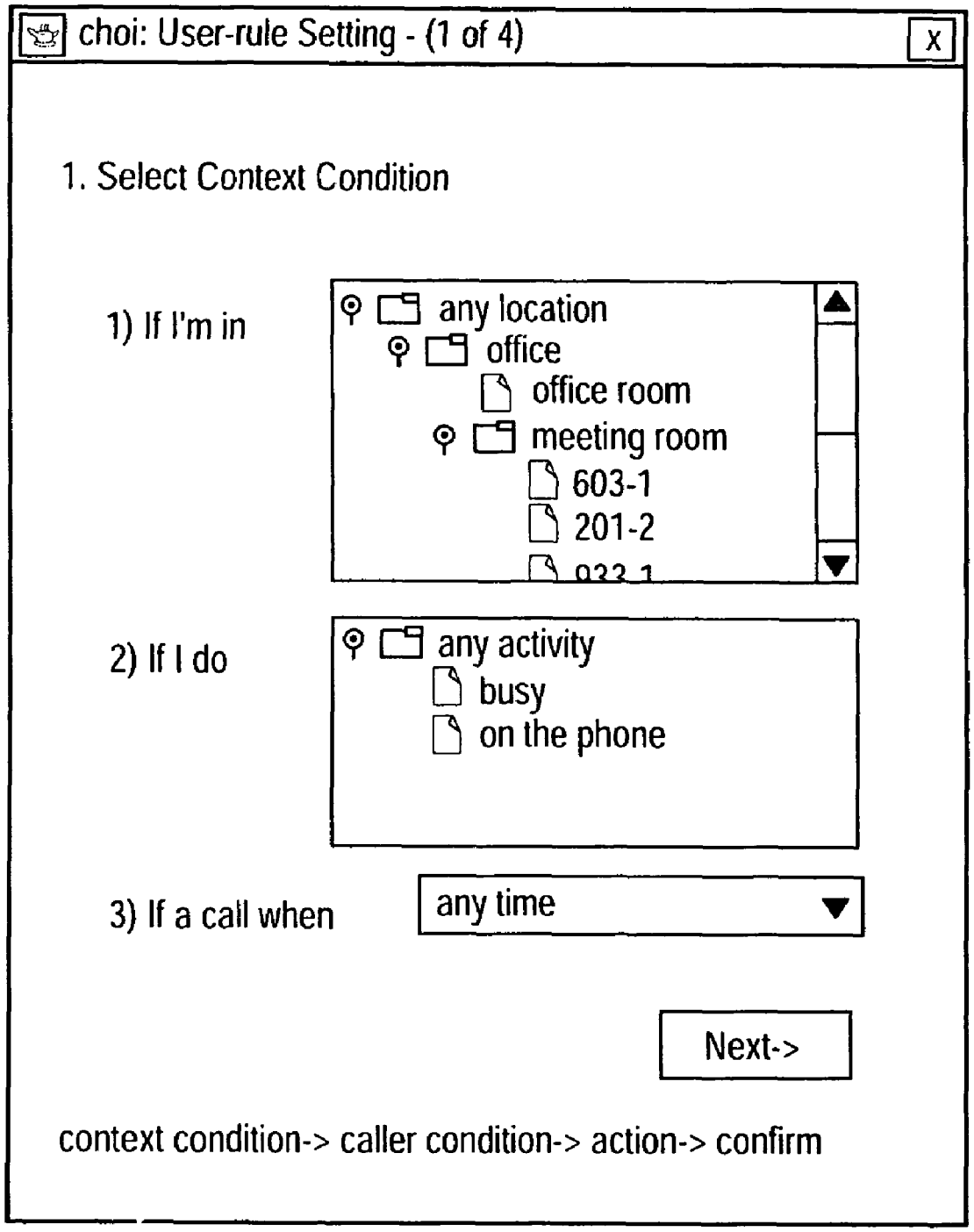
FIG. 23 is a window displayed to the user for selecting context when setting a user rule according to the present invention.

Clicking the "Add" button in the "User-rule Setting Window" starts the creation of a new rule. Adding a new user rule involves four steps. The first step is to select the contexts as a part of the conditions of the rule being created (FIG. 23). The location and activity selection are made from a given hierarchy tree. These hierarchies of location and activity are defined by the administrator from a server. The time context is selected from a pull-down menu with three choices: "any time", "meeting time" and "lunch time". The actual time schedules are set by the user through the "Schedule Setting Window." The steps are displayed at the bottom of the window and the current step is written in red. When the context conditions have been selected, the user clicks the "Next" button to move to the second step.

The second step is selecting a type of caller as a part of the condition. One of three categories can be selected: any caller, a buddy list table, and a relationship tree. These three categories are exclusive, so that radio buttons are provided to select only one category. When a category is selected, the user can then select items in its selection window. FIG. 24 shows an example of the selection of "Buddy". One of the buddies can now be selected from the buddy table, whereas the relationship hierarchy window remains disabled.

The third step is selecting an action of the rule from the predefined list of actions, as shown in FIG. 25. The action items are listed with their associated radio buttons, and only one can be selected from the list.

Figure 26:
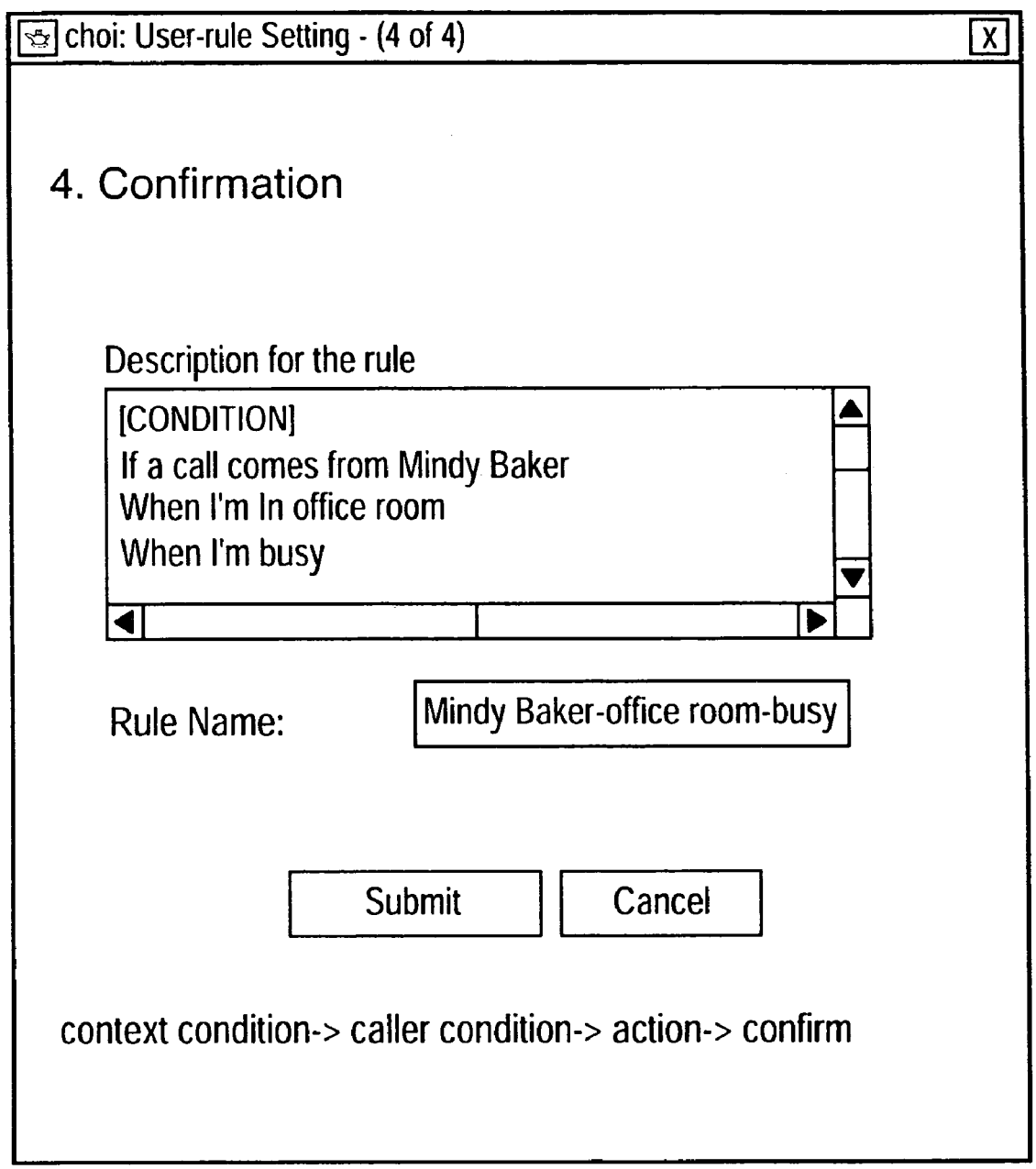
FIG. 26 is a confirmation window displayed to the user when setting a user rule according to the present invention.

The fourth and the last step for creating a new rule is confirmation. As shown in FIG. 26, the user confirms and assigns a unique rule name. The "Description for the rule" window shows the selections the user made: the condition(s) and an action. Clicking 'Submit' saves the new rule.

Figure 27:
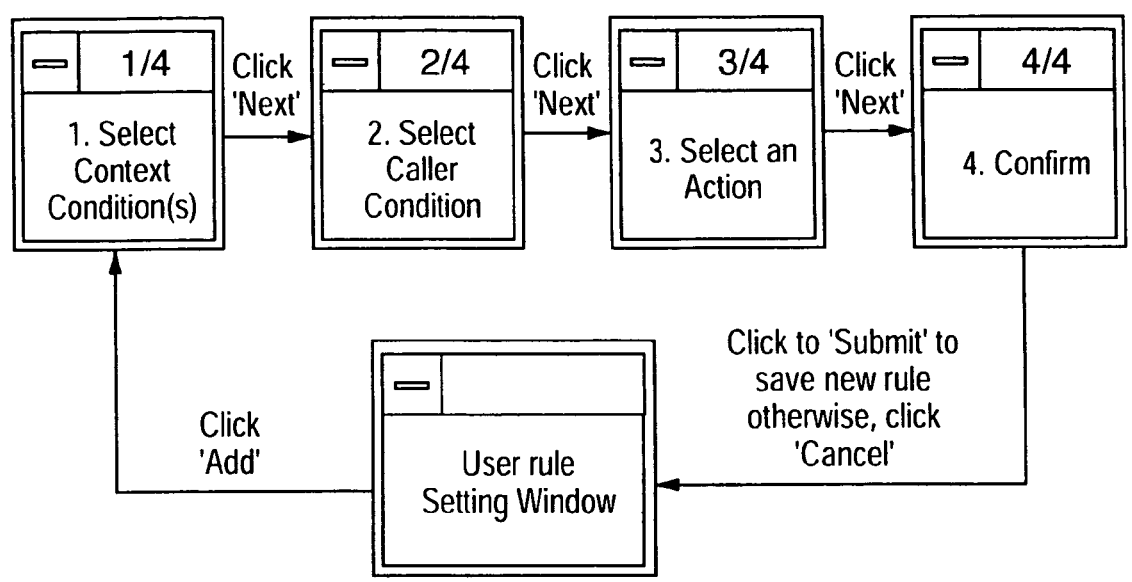
FIG. 27 is a flowchart showing the steps for creating a user rule, according to FIGS. 23 to 26.

The description of the rule as an example for creating a new rule (from FIGS. 23 to 26) is as follows:
Rule Name: Mindy Baker-Office Room-Busy Rule
Condition: If a call is coming from [Mindy Baker]
 And when I'm in my [office room]
 And when I'm [busy]
Action: Forward it to secretary The entire process to create a user preference rule is shown in FIG. 27.

Figure 28:
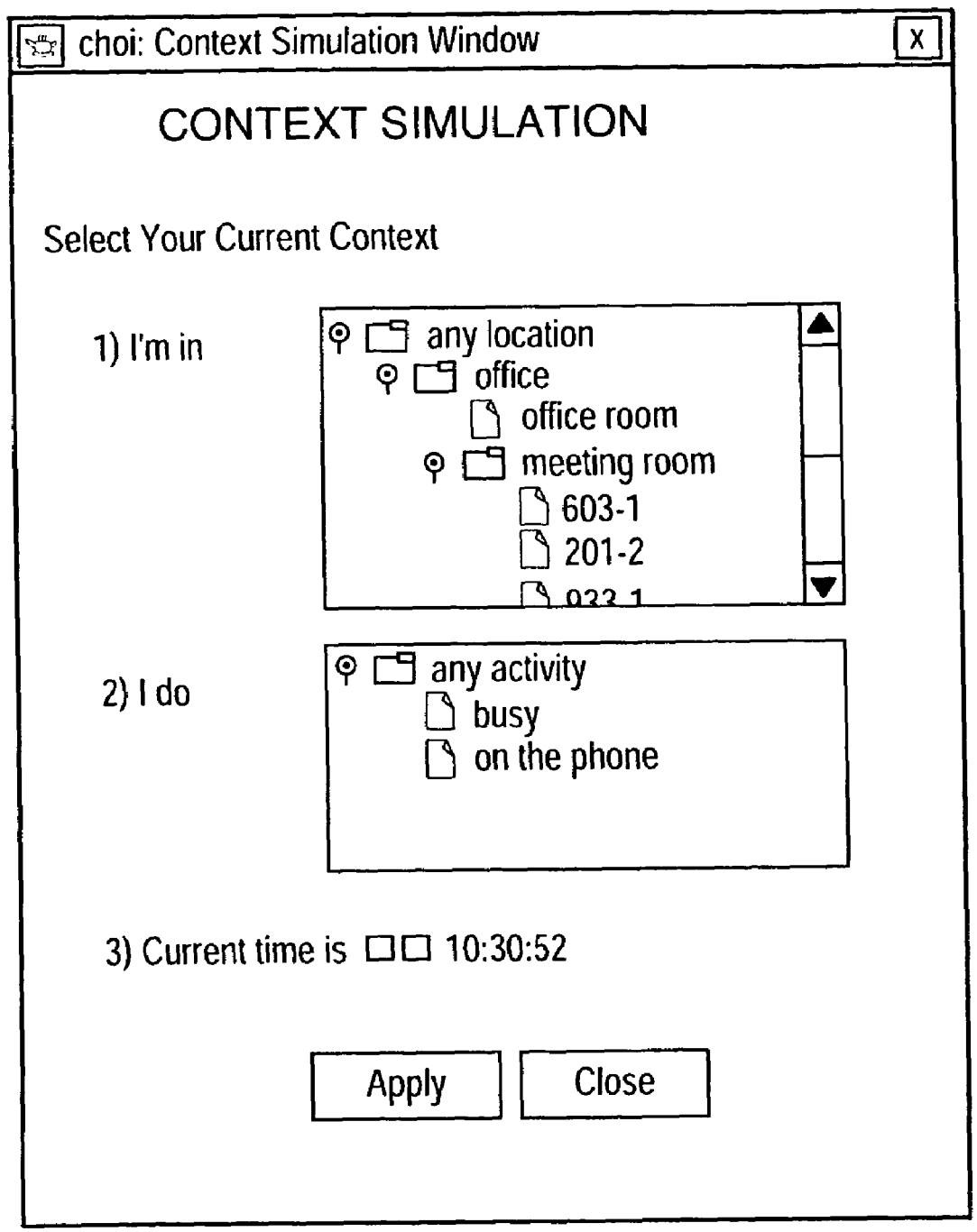
FIG. 28 is a context simulation window displayed to the user during operation of the system according to the present invention.

Ultimately, the user's current contexts such as the current location and activity are updated by the Context Agent. In the successful prototype, a simulation program was used to substitute the occurrence of events in real-life. For testing purposes, the tester selects one of the desired contexts on the hierarchy trees, and then clicks the "Apply" (FIG. 28). The current time, which is displayed on the window, is the client machine's system time that is used as time context by matching with a user's schedule.

As discussed above, the client has two agents: the Call Delivery Agent (CD) agent and the System Management Agent (SM) agent. Each agent has its own display window to present procedural messages to a user. The CD agent is connected to both the TSpaces server 23 to communicate with other agents and to the MiTAI Gateway server 25 to communicate with the phone system.

Figure 29:
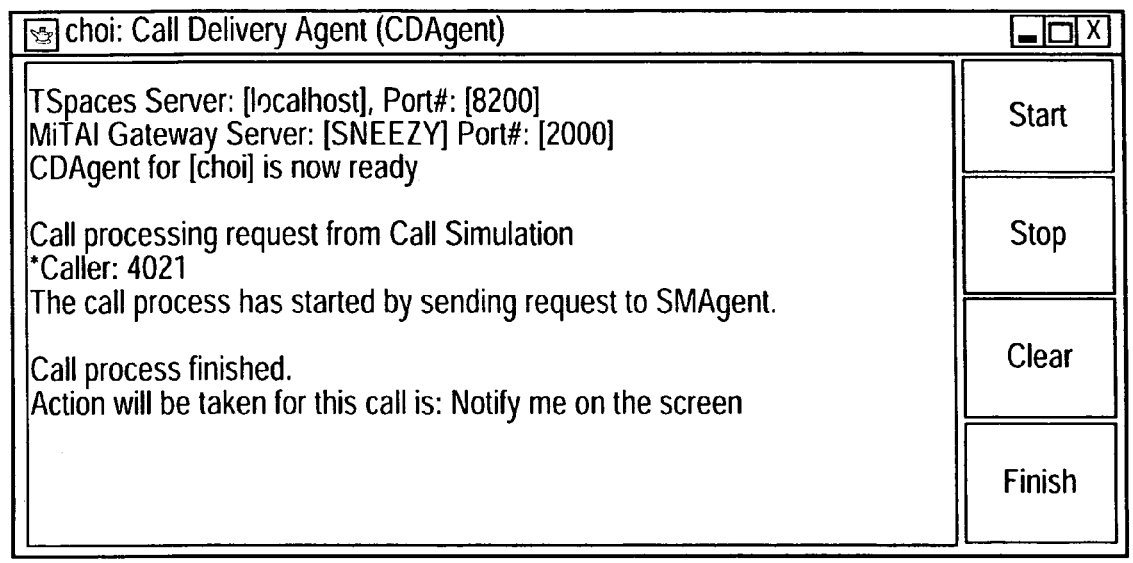
FIG. 29 is a call delivery agent window displayed to the user during operation of the system according to the present invention.

The window in FIG. 29 displays the machine name and the port number of the TSpaces server 23, which this client is connected to. The default TSpaces server name is "localhost", which is the same machine as the current client machine. The second line shows the MiTAI Gateway server name and its port number. The "CDAgent for [choi] is now ready" means that the two necessary connections are confirmed, and the CD agent is ready for the user, whose user ID is "choi".

Figure 30:
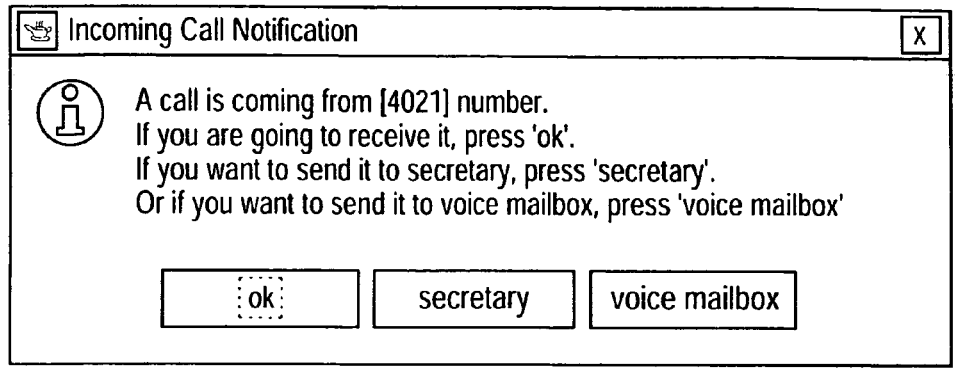
FIG. 30 is an incoming call notification window displayed to the user during operation of the system according to the present invention.

A call processing request can be received from either the Call Simulation or the Call Monitor. The Call Monitor communicates with the MiTAI Gateway server 25 for handling actual phone calls whereas the Call Simulation is another window on a server machine to test the system without MiTAI Gateway interfaces. When call processing has finished involving all the available agents, the CD agent extracts the selected user rule, which is a result of the processing, and requests the Call Monitor to carry out the action stated in the selected rule. When the example in FIG. 29 is executed, the action, "Notify me on the screen", results in a notification window on the client machine, as shown in FIG. 30.

Figure 31:
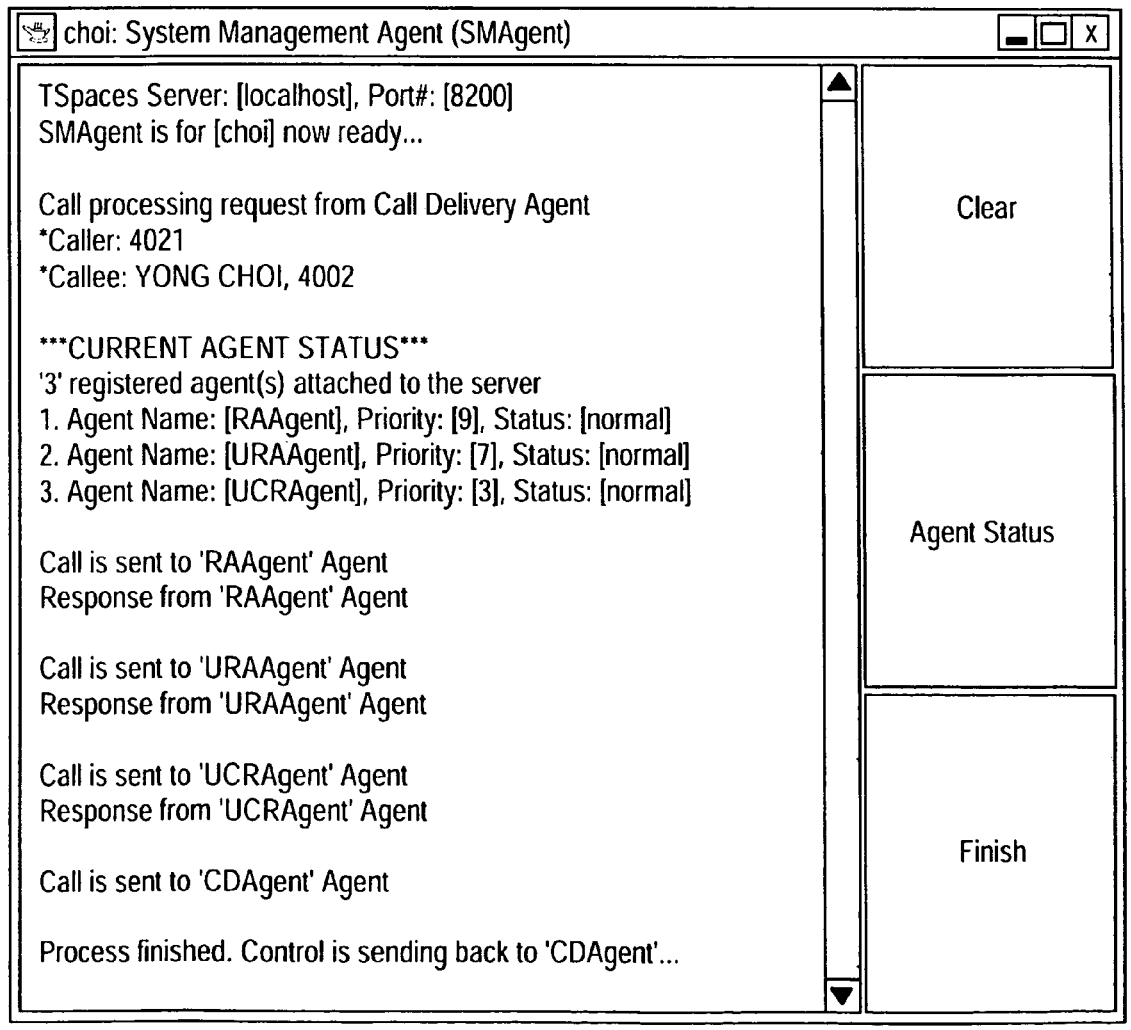
FIG. 31 is a system management agent window displayed to the user during operation of the system according to the present invention.

The SM agent is also connected to the TSpaces server 23 to communicate with other agents. The display in FIG. 31 confirms the established connection. The default TSpaces server name is "localhost", which is the same as the CD agent's default server name. "SMAgent is for [choi] now ready" means that the necessary connection is confirmed and the SM agent is ready for the user, whose user ID is "choi". The SM agent is responsible for sequencing the available agents according to their priority. The display window shows the sequencing of the agents as a part of the call processing. When the CD agent notifies the user about an incoming call, the SM agent retrieves the status of the agents and distributes a call control to the each agent. On the completion of the call processing, the control is sent back to the CD agent to execute the selected action. The SM agent window has an "Agent Status" button that allows the user to check the agent status manually. The "Clear" button clears the message display area and the "Finish" button exits the system.

In summary, according to the present invention a model of contexts is defined for a message delivery system and a system architecture provided that facilitates the creation of context- and rule-based communication. Location context is used to forward incoming calls based on location information. The user's activity or availability is used in the instant invention to notify other connected users about the user's status such as "busy", "be back", "away" and "lunch". The time context is used to set the time of application of certain user-defined rules.

By receiving the appropriate messages in the right situation, system users benefit from minimal interruptions. By exploiting personal traits and filtering messages based on both a user's current context models and his/her preference rules, the possibility of having desirable delivery action for the user is enhanced. Although the user's current contexts have been simulated for the purpose of the working prototype of the system set forth in detail above, a person of skill in the art will readily appreciate that the system can be implemented with a Context Agent, which actually detects a user's contexts. To that end, a simple type of the Context Agent, which detects a computer's mouse movement, has been tested. In operation, a user who uses multiple machines in the network first logs into a particular computer. The Context Agent detects the computer's mouse movement and in response updates the user's location information in the Tspaces 37 so that an incoming call can be notified or forwarded to the user at that location.

As discussed in our co-pending application filed on the same day as this application and entitled "Privacy and Security for Presence Systems with Tuple Spaces", although using the TSpaces 37 provides great flexibility in the aspect of multiple agent system design, it suffers from a weakness in security since it allows for the sharing of all information. Some of the privacy-sensitive information such as the user profile should be protected. The TSpaces server 23 provides access control by setting user and group permissions on the Tspaces 37 so that only users with the proper access control permissions may read and write tuples from the TSpaces. Additional security measures are set forth in the aforenoted copending application.

Also, although the successful prototype has been described in terms of call processing, it is contemplated that the principles of the invention may be extended to implement context-based event handling beyond telephony, such as email processing, visitor notification services, etc.

All such modifications and variations are believed to be within the sphere and scope of the present invention as defined by the claims appended hereto.

The following Appendix sets forth in greater detail the structure and operation of specific tuples used to implement the successful prototype:

Appendix: Structure of Knowledge

Knowledge is stored in the Tspaces 37. The unit of knowledge is a "tuple", which is also the unit of data transaction with the TSpaces. A tuple is an aggregation of field(s), and maximum of seven fields are allowed by the TSpaces. The first field is reserved for the name of a tuple, and other fields can be either a simple string or a string with tags[1]. The simple string will be marked as 'String', and the string with tags will be marked as 'Tag String' in the definitions below. There are four tuples for this system: 'UserProfile', 'Call', 'Context', and 'Agentinfo'.

[1] Each field contains simple, but flexible data. It uses tags similar to XML format, but it does not use any particular parser due to the problems of TSpaces with XML. It uses internal function to have access to data instead of parsing.

There are user-defined fields: the 'relationship' in the 'UserProfile', the 'location' and the 'activity' in the 'Context'. The knowledge structure for those fields will be defined during run-time by using the GuIs. Those fields will be marked as the 'User Defined'. Some fields allow saving many same-format-fields. For example, the 'userrule' field in the 'User-Profile' tuple allows saving many user rules in that field. (marked as *)

1. UserProfile

1.1 Description

This is user specific information, includes basic user information, for call delivery.

1.2 Tuple Fields

| Tuple Name :: 'UserProfile' |
| --- |
| + id : String |
| + userinfo : Tag String |
| + relationship : Tag String - User Defined |
| + buddylist* : Tag String |
| + userrule* : Tag String |
| + context : Tag String | userinfo Field: This field contains fundamental user information for operating the system.

| Field Name :: 'userinfo' |
| --- |
| + passwd : String |
| + fname : String |
| + lname : String |
| + office : String |
| + home : String |
| + cell : String |
| + secretary : String |
| + lunch time : String |
| + meeting time : String |

```
<?xml version="1.0"?>[2]
<!DOCTYPE userinfo [
    <!ELEMENT userinfo (passwd, fname, lname, office,
home?, cell?, secretary?, lunch time?, meeting time?)>
    <!ELEMENT passwd   (#PCDATA)>
    <!ELEMENT fname    (#PCDATA)>
    <!ELEMENT lname    (#PCDATA)>
    <!ELEMENT office   (#PCDATA)>
    <!ELEMENT home     (#PCDATA)>
    <!ELEMENT cell     (#PCDATA)>
    <!ELEMENT secretary (#PCDATA)>
    <!ELEMENT lunch time (#PCDATA)>
    <!ELEMENT meeting time (#PCDATA)>
] >
``` relationship Field: This field contains the hierarchy of personalized relationship information that is defined by a user using GUI.

buddylist Field: This field contains a list of buddy and their information, which is set by a user

| Field Name :: 'buddylist' |
| --- |
| + fname : String |
| + lname : String |
| + phone : String |
| + relationship : String |

```
<?xml version="1.0"?>
<!DOCTYPE buddylist [
    <!ELEMENT buddylist (fname,lname,phone,relationship)>
    <!ELEMENT fname       (#PCDATA)>
    <!ELEMENT lname       (#PCDATA)>
    <!ELEMENT phone       (#PCDATA)>
    <!ELEMENT relationship (#PCDATA)>
] >
``` userrule Field: This field contains a list of user rules, which are created by a user

| Field Name :: 'userrule' |
| --- |
| + rulename : String |
| + condition : String |
|   + fname : String |
|   + lname : String |
|   + phone : String |
|   + relationship : String |
|   + location : String |
|   + activity : String |
|   + time : String |
| + action : String |

```
<?xml version="1.0"?>
<!DOCTYPE userrule [
    <!ELEMENT userrule (rulename, condition, action)>
    <!ELEMENT rulename (#PCDATA)>
    <!ELEMENT       condition(fname?, lname?, phone?,
relationship?, location?, activity?, time?)>
    <!ELEMENT fname (#PCDATA)>
    <!ELEMENT lname (#PCDATA)>
    <!ELEMENT phone (#PCDATA)>
    <!ELEMENT relationship (#PCDATA)>
    <!ELEMENT location (#PCDATA)>
    <!ELEMENT activity (#PCDATA)>
    <!ELEMENT time (#PCDATA)>
    <!ELEMENT action (#PCDATA)>
] >
``` context field: This field contains the user's current contexts, which are set by either simulation agent or context agent.

| Field Name :: 'context' |
| --- |
| + location : String |
| + activity : String |

```
<?xml version="1.0"?>
<!DOCTYPE context [
    <!ELEMENT context (location, activity)>
    <!ELEMENT location(#PCDATA)>
    <!ELEMENT activity(#PCDATA)>
] >
```

2. Call

2.1 Description

This tuple is for call processing among agents.

2.2 Tuple Fields

| Tuple Name :: 'Call' |
| --- |
| + destagent : String<br>+ sourceagent : String<br>+ id : String<br>+ callinfo : Tag String<br>+ userrule* : Tag String<br>+ policyrule* : Tag String | destagent Field: This field contains a name of the destination agent that will receive this tuple.

sourceagent Field: This field contains a name of the source agent that is sending this tuple.

id Field: This is a unique user id that using as a key value to scan and read tuples.

callinfo Field: This field contains basic information of both a caller and a receiver such as phone number and name. It also contains relationship information between them.

| Field Name :: 'callinfo' |
| --- |
| + callerinfo : String<br>  + phone : String<br>  + fname : String<br>  + lname : String<br>+ calleeinfo : String<br>  + phone : String<br>  + fname : String<br>  + lname : String<br>+ relationship : String |

```
<?xml version"1.0"?>
<!DOCTYPE callinfo [
    <!ELEMENT callinfo (callerinfo, calleeinfo, relationship?)>
    <!ELEMENT callerinfo (phone, fname, lname)>
    <!ELEMENT phone (#PCDATA)>
    <!ELEMENT fname (#PCDATA)>
    <!ELEMENT lname (#PCDATA)>
    <!ELEMENT calleeinfo (phone, fname, lname)>
    <!ELEMENT phone (#PCDATA)>
    <!ELEMENT fname (#PCDATA)>
    <!ELEMENT lname (#PCDATA)>
    <!ELEMENT relationship (#PCDATA)>
] >
``` userrule Field: This field contains user preference rules that are selected by agent(s). The format of this field is exactly the same as that 'UserProfile' has.

3. Context

3.1 Description

This is the hierarchy of context information that will be decided and input by system administrator. The contexts, which will be used in our prototype system, are a user's location, his/her current activity and the present time.

3.2 Tuple Fields

| Tuple Name :: 'Context' |
| --- |
| + location : String<br>+ activity : String |

4. AgentInfo

4.1 Description

Agents are responsible for updating their status into the TSpaces. The SM agent uses this agent information when it decides the sequence of the process according to their availability.

4.2 Tuple Fields

| Tuple Name :: 'AgentInfo' |
| --- |
| + agentname : String<br>+ priority : String<br>+ status : String |

```
<?xml version="1.0"?>
<!DOCTYPE agentinfo [
    <!ELEMENT agentinfo (agentname,priority,status)>
    <!ELEMENT agentname  (#PCDATA)>
    <!ELEMENT priority(#PCDATA)>
    <!ELEMENT status (#PCDATA)>
] >
```

The invention claimed is:

1. A context aware call handling system comprising:

a shared database;

a communication network;

a user interface for setting user preference call handling rules; and an application level for making assertions to said shared database relating to current user context and incoming call information from a caller over said communication network, and in response handling said incoming call by applying said user preference call handling rules based on said user context and said call information; and wherein said application level further comprises a plurality of server modules and client modules for performing knowledge management and agent services, including:

a user knowledge management module for setting said current user context and said user preference call handling rules as assertions in said shared database;

a client agent services module for receiving a notification of said incoming call from said communication network and in response generating agent processing reguests as assertions in said shared database;

a system knowledge management module having a context set sub-module for administrator creation and modification of context hierarchy; and a server agent services module for receiving said agent processing reguests via said shared database and in response assigning at least one relationship between said user and said caller, retrieving said at least one relationship between the user and said caller and said current user context, and selecting a single one of said user preference call handling rules based on said relationship.

2. A system as claimed in claim 1, wherein said user knowledge management module further includes a buddy-list set sub-module for user creation and maintenance of a list containing information about individuals and relationships between said individuals and said user, a relationship set sub-module for user definition of a relationship hierarchy between said individuals and said user, a schedule set sub-module for user schedule setting, and a user-rule set sub-module for user setting of preferences for call handling based on one or more or said buddy-list, relationship hierarchy, and schedule.

3. A system as claimed in claim 2, wherein said client agent services module further includes a call delivery (CD) agent for receiving notification from said communication network of said incoming call and in response generating a request for call processing, and a system management (SM) agent for receiving said request for call processing and in 5 response generating said agent processing requests.

4. A system as claimed in claim 3, wherein said server agent services module further includes a relationship assigning (RA) agent for assigning said at least one relationship between said user and said caller according to said buddy-list, a user rule assigning (URA) agent for retrieving said at least one relationship between the user and said caller and said current user context, and a user conflict resolving (UCR) agent for responding to said system management (SM) agent with said single one of said user preference call handling rules based on said at least one relationship.

5. A system as claimed in claim 4, wherein said user conflict resolving (UCR) agent selects as said single rule one of either:
a most specific one of said user preference call handling rules having more conditions than other ones of said rules, in the event that said rules have different numbers of conditions;
one of said user preference call handling rules having more specific conditions than other ones of said rules, in the event that said rules have identical numbers of conditions;
a most recently created one of said rules; or
a randomly selected one of said rules.

6. A system as claimed in claim 1, further including a gateway between said call delivery (CD) agent and said communication network.

7. A system as claimed in claim 6, wherein said communication network is a PBX connected to the public switched telephone network (PSTN).

8. A system as claimed in claim 1, wherein said user interface includes windows for login, user preference rule setting, context setting and message display.

9. A system as claimed in claim 1, further including an event handler between said user interface and said application level for directing events from said user interface to appropriate modules of said application level.

10. A system as claimed in claim 1 wherein said shared database is a tuple space and said assertions are tuples.

11. A context aware call handling method according to user preference call handling rules, comprising:
receiving an incoming call from a caller to a user;
monitoring current context of said user;
applying said user preference call handling rules based on said user context and said call information,
a user setting at least one caller relationship to said user;
applying said user preference call handling rules based further on said at least one caller relationship;
setting said current user context and said user preference call handling rules as tuples in a tuple space;
receiving a notification of said incoming call and in response generating agent processing requests as tuples in said tuple space; and
receiving said agent processing reguests via said tuple space and in response assigning at least one relationship between said user and said caller, retrieving said relationship between the user and said caller and said current user context, and selecting a single one of said user preference call handling rules based on said relationship.

12. A method as claimed in claim 11, further comprising:
a user creating and maintaining a list containing information about individuals and relationships between said individuals and said user;
a user defining a relationship hierarchy between said individuals and said user;
a user setting a schedule; and
a user setting preferences for call handling based on one or more or said buddy-list, relationship hierarchy, and schedule.

13. A method as claimed in claim 11, wherein said step of selecting said single one of said user preference call handling rules further comprises selecting as said single rule one of either:
a most specific one of said user preference call handling rules having more conditions than other ones of said rules, in the event that said rules have different numbers of conditions;
one of said user preference call handling rules having a more specific conditions than other ones of said rules, in the event that said rules have identical numbers of conditions; and otherwise
a most recently created one of said rules.

14. A context aware call handling system comprising:
a shared database;
a communication network;
a user interface for setting user preference call handling rules;
an application level for making assertions to said shared database relating to current user context and incoming call information from a caller over said communication network, and in response handling said incoming call by applying said user preference call handling rules based on said user context and said call information; and
a gateway between said call delivery agent and said communication network, and wherein
said application level further comprises a plurality of server modules and client modules for performing knowledge management and agent services, including a user knowledge management module for setting said current user context and said user preference call handling rules as receiving a notification of said incoming call from said communication network and in response generating agent processing requests as assertions in said shared database, a system knowledge management module having a contest set sub-module for administrator creation and modification of context hierarchy, and a server agent services module for receiving said agent processing requests via said shared database and in response assigning at least one relationship between said user and said caller, retrieving said at least one relationship between the user and said caller and said current user context, and selecting a single one of said user preference call handling rules based on said relationship.

15. A system as claimed in claim 2, further including a gateway between said call delivery (CD) agent and said communication network.

16. A system as claimed in claim 3, further including a gateway between said call delivery (CD) agent and said communication network.

17. A system as claimed in claim 4, further including a gateway between said call delivery (CD) agent and said communication network.

18. A system as claimed in claim 5, further including a gateway between said call delivery (CD) agent and said communication network.

19. A system as claimed in claim 1, wherein said user interface includes windows for login, user preference rule setting, context setting and message display.

20. A system as claimed in claim 2, wherein said user interface includes windows for login, user preference rule setting, context setting and message display.

21. A system as claimed in claim 3, wherein said user interface includes windows for login, user preference rule setting, context setting and message display.

22. A system as claimed in claim 4, wherein said user interface includes windows for login, user preference rule setting, context setting and message display.

23. A system as claimed in claim 5, wherein said user interface includes windows for login, user preference rule setting, context setting and message display.

24. A system as claimed in claim 6, wherein said user interface includes windows for login, user preference rule setting, context setting and message display.

25. A system as claimed in claim 7, wherein said user interface includes windows for login, user preference rule setting, context setting and message display.

26. A context aware call handling method according to user preference call handling rules, comprising:
  receiving an incoming call from a caller to a user;
  monitoring current context of said user;
  applying said user preference call handling rules based on said user context and said call information,
  a user setting at least one caller relationship to said user;
  applying said user preference call handling rules based further on said at least one caller relationship;
  setting said current user context and said user preference call handling rules as tuples in a tuple space;
  receiving a notification of said incoming call and in response generating agent processing requests as tuples in said tuple space; and
  receiving said agent processing requests via said tuple space and in response assigning at least one relationship between said user and said caller, retrieving said relationship between the user and said caller and said current user context, and selecting a single one of said user preference call handling rules based on said relationship.

27. A method as claimed in claim 12, wherein said step of selecting said single one of said user preference call handling rules further comprises selecting as said single rule one of either:
  a most specific one of said user preference call handling rules having more conditions than other ones of said rules, in the event that said rules have different numbers of conditions;
  one of said user preference call handling rules having a more specific conditions than other ones of said rules, in the event that said rules have identical numbers of conditions; and otherwise
  a most recently created one of said rules.

* * * * *